(12) United States Patent
Messick, Jr. et al.

(10) Patent No.: US 10,858,191 B2
(45) Date of Patent: Dec. 8, 2020

(54) MODULAR TOP FLATWIRE CONVEYOR BELT SYSTEMS AND METHODS

(71) Applicant: Cambridge International, Inc., Cambridge, MD (US)

(72) Inventors: George H. Messick, Jr., Cambridge, MD (US); Thomas O. Perdue, Salisbury, MD (US); Remco van der Ende, De Lier (NL); Melody E. Fernaays, Yorktown, VA (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 16/561,563

(22) Filed: Sep. 5, 2019

(65) Prior Publication Data

US 2020/0079592 A1    Mar. 12, 2020

Related U.S. Application Data

(60) Provisional application No. 62/728,497, filed on Sep. 7, 2018.

(51) Int. Cl.
    *B65G 17/08*    (2006.01)
(52) U.S. Cl.
    CPC .................................. *B65G 17/08* (2013.01)

(58) Field of Classification Search
    None
    See application file for complete search history.

(56) References Cited

U.S. PATENT DOCUMENTS

| 2,621,779 | A  | 12/1952 | Harter |
| 3,045,809 | A  | 7/1962 | Bechtel, Jr. |
| 3,520,398 | A  | 7/1970 | Thomson |
| 3,863,754 | A  | 2/1975 | Van Lake |
| 6,854,590 | B2 | 2/2005 | Rudy et al. |
| 7,494,005 | B2 | 2/2009 | Messick, Jr. et al. |
| 9,061,829 | B2 | 6/2015 | Salsone et al. |
| 9,776,799 | B2 | 10/2017 | Ulchak et al. |

OTHER PUBLICATIONS

Rexnord, Fortrex 9200 Stainless Steel MatTop Chain—Pasteurizers, Warmers, Coolers, Copyright 2008 Rexnord Industries, LLC, 8 pages.
PCT International Search Report and Written Opinion, PCT/US2019/49731, dated Feb. 10, 2020, 17 pages.

*Primary Examiner* — William R Harp
(74) *Attorney, Agent, or Firm* — Quarles & Brady LLP

(57) ABSTRACT

A flatwire conveyor belt assembly includes pickets defining a leading link and a trailing link, wherein adjacent pickets are coupled with a cross-rod that extends through openings formed in the leading link and in the trailing link of adjacent pickets. Top plates are coupled to the pickets and define a conveying surface.

25 Claims, 24 Drawing Sheets

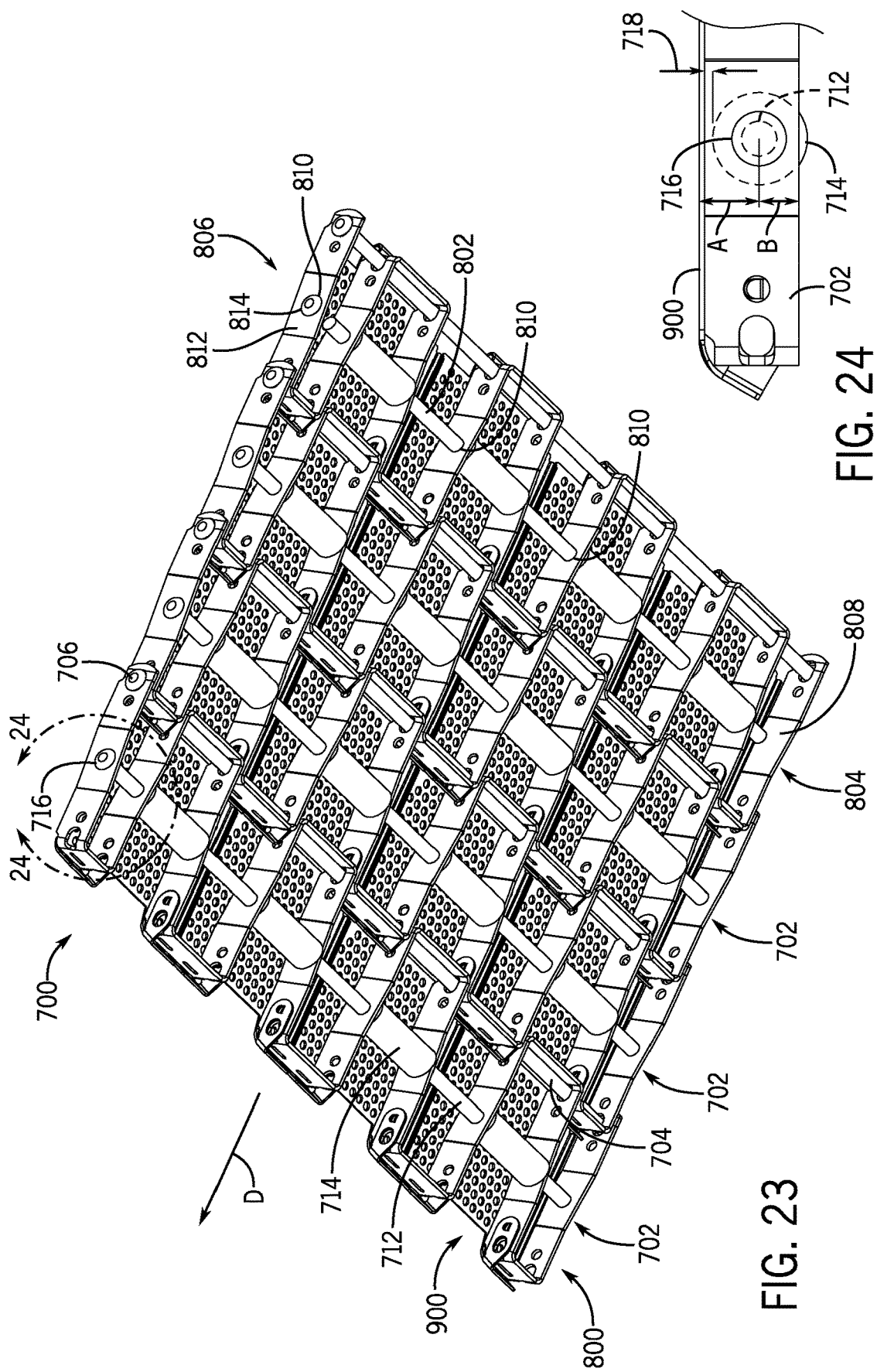

MODULAR TOP FLATWIRE CONVEYOR BELT SYSTEMS AND METHODS

CROSS-REFERENCE TO RELATED APPLICATION

This application claims priority under 35 U.S.C. § 119 to U.S. Provisional Patent Application No. 62/728,497 filed on Sep. 7, 2018, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of flatwire conveyor belt arrangements. More specifically, the present disclosure relates to flatwire conveyor belt systems incorporating a modular top plate engaged with an underlying picket, which can also be configured to accommodate a guide system.

BACKGROUND

Flatwire conveyor belts, which are typically constructed from metal strips (e.g., pickets or wickets) that are interconnected with cross-rods, continue to have applicability for a variety of conveying applications. The construction of flatwire conveyor belts offers an efficient strength-to-weight ratio that is relatively cost-effective to manufacture. One disadvantage of conventional flatwire conveyor belts relates to the relative openness of the conveying surface, which presents challenges for transporting product of a size and/or form factor that is incompatible with the relatively open conveying surface. For example, conventional construction establishes larger open areas that can hamper effective carrying of correspondingly smaller products (e.g., products may pass partially through, become entangled with, or be unstable on the conveying surface). Conventional construction can also inhibit a smooth, continuous transfer of product both on to and off of the flatwire conveyor belt.

In addition, during use, conventional flatwire conveyor belts may have a tendency, in particular applications, to shift or wander laterally relative to a conveying direction. The metal strip construction of current flatwire conveyor belts presents practical challenges of effectively and efficiently controlling and/or reducing undesirable lateral movement of the flatwire conveyor belt.

Therefore, a need exists for an improved flatwire conveyor belt system that maintains the conventional features and benefits, while addressing various deficiencies associated with the implementation and operation of flatwire conveyor belt assemblies.

SUMMARY

Some embodiments provide a flatwire conveyor belt assembly comprising a plurality of pickets, each picket defining a leading link and a trailing link. Adjacent pickets are coupled with a cross-rod that extends through openings formed in the leading link and in the trailing link of adjacent pickets of the plurality of pickets. A plurality of top plates are coupled to the plurality of pickets, wherein the plurality of top plates define a conveying surface.

In another embodiment, a module that is capable of use in a flatwire conveyor belt assembly comprises a picket having leading links and trailing links, and defining a picket leading portion proximate the leading links and a picket trailing portion proximate the trailing links. The module also includes a top plate having a leading end and a trailing end, the top plate defining a top plate leading portion proximate the leading end and a top plate trailing portion proximate the trailing end. The picket and the top plate interface at a leading interface defined by the interface of the picket leading portion and the top plate leading portion. And, the picket and the top plate interface at a trailing interface defined by the interface of the picket trailing portion and the top plate trailing portion.

In a further embodiment, a top plate, that is capable of use in a flatwire conveyor belt assembly having a picket that defines leading link ends and trailing link ends, comprises a leading end, a top plate leading interface portion proximate the leading end, a trailing end opposite the leading end, a top plate trailing interface portion proximate the trailing end, and a transport surface that extends between the leading end and the trailing end. The top plate leading interface portion is configured to selectively engage the leading link ends of the picket. And, the top plate trailing interface portion is configured to selectively engage the trailing link ends of the picket.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

FIG. 23 is a bottom isometric view of a portion of an example flatwire conveyor belt in accordance with one embodiment.

FIG. 24 is an enlarged view of the flatwire conveyor belt of FIG. 23 circumscribed by arc 24-24 of FIG. 23.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from embodiments of the invention. Thus, embodiments of the invention are not intended to be limited to embodiments shown, but are to be accorded the widest scope consistent with the principles and features disclosed herein.

Figure 1:
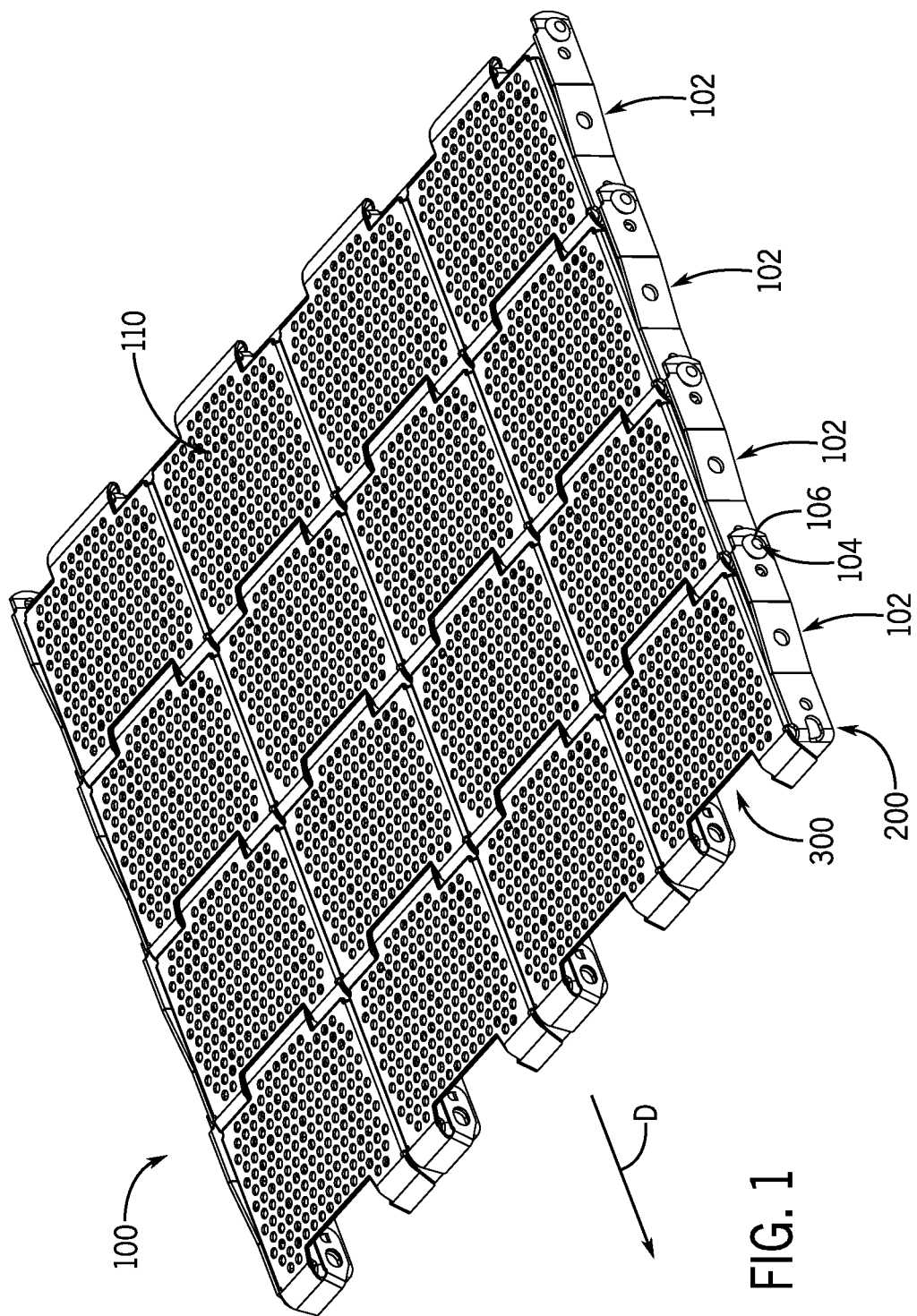
FIG. 1 is a top isometric view of a portion of an example flatwire conveyor belt in accordance with one embodiment.
Figure 2:
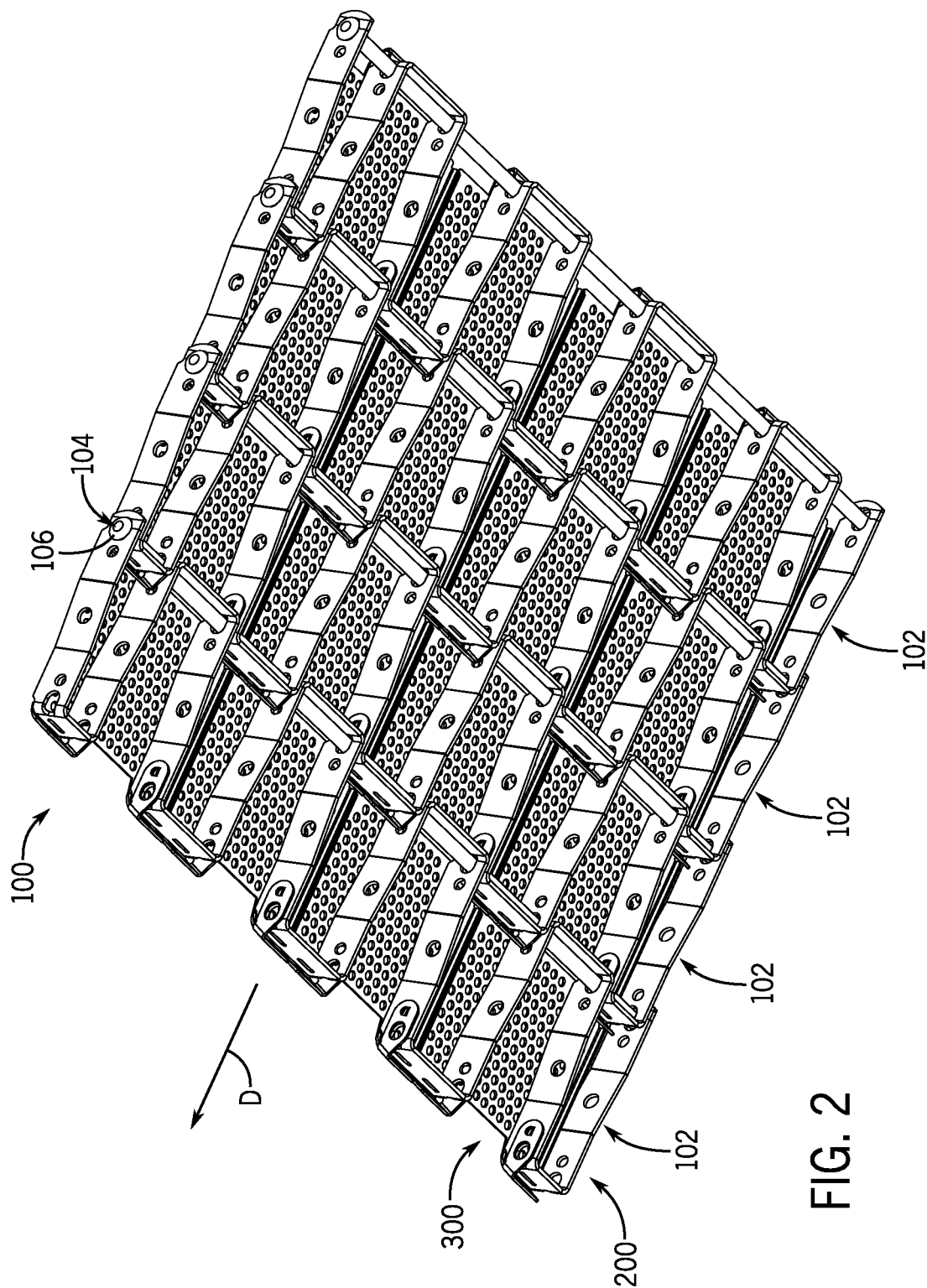
FIG. 2 is a bottom isometric view of the example flatwire conveyor belt.

Several rows of a flatwire conveyor belt 100 in accordance with one example embodiment are depicted in FIGS. 1 and 2. The flatwire conveyor belt 100 is typically an endless belt driven in a direction of travel (designated by arrow D), and constructed to address particular application requirements. Each row 102 includes a picket 200 that supports multiple modular top plates 300. Adjacent rows 102 are interconnected by a cross-rod 104 that extends laterally (relative to the direction of travel D) through the pickets 200 and the top plates 300, generally forming a hinge connection. In use, the cross-rods 104 are typically engaged by one or more sprockets driven by a motor that rotates the sprocket(s) to engage and drive against the cross-rods 104 from beneath the flatwire conveyor belt 100. In the example shown, the cross-rod 104 is metallic with ends 106 that are formed or mushroomed to limit lateral movement (i.e., in a direction generally skewed to the direction of travel D) of the cross-rod 104 once adjacent rows 102 are interconnected. In alternative embodiments, other restraint mechanisms can be used to restrain the cross-rod, such as collars or clips, and the cross-rod can be constructed of non-metallic materials (e.g., plastics or composites).

The form factor of each picket 200 allows for adjacent pickets 200 to be interconnected and provides for interface features that allow the top plates 300 to be secured to, in some embodiments, both the picket 200 and the cross-rod 104. The example picket 200 is shown and described with additional reference to FIGS. 3-5, and is typically manufactured and formed from a single metallic strip having a generally uniform cross-section. While the pickets 200 are shown to define a specific pitch P (i.e., a center-to-center distance between adjacent cross-rods 104) and a specific opening width W (i.e., a nominal form to allow nesting and intermeshing of an adjacent picket 200), the form factor of the picket 200 can be adapted to address application-specific requirements (e.g., weight of product, speed of conveyance, overall conveyor belt envelope constraints, etc.).

The example picket 200 includes edge links 202 that flank alternating leading links 204 and trailing links 206. While the form factor of the edge links 202, leading links 204, and trailing links 206 can be generally uniform in particular applications, the edge links 202 in the example embodiment are narrower than the individual leading links 204 and trailing links 206. Specifically, the edge links 202 define an edge end portion 208 that is approximately half the size of a leading end portion 210 of the leading link 204 or a trailing end portion 212 of the trailing link 206. The leading links 204 and the trailing links 206 are generally U-shaped (as viewed in FIG. 4) having pairs of leg portions 216 formed generally orthogonally to the respective leading end portion 210 and trailing end portion 212. Adjacent leg portions 216 of laterally spaced leading links 204 and trailing links 206 are bridged by side bars 214 that, in the example embodiment, are skewed relative to the pairs of leg portions 216.

The form of the example edge links 202 varies from the leading links 204 and the trailing links 206 in some respects. The edge end portion 208 of each edge link 202 is also generally U-shaped (as viewed in FIG. 4) and defines an inner leg portion 218 and an outer leg portion 220 that are formed generally orthogonally to the edge end portion 208. In the example embodiment, a side bar 214 bridges the inner leg portion 218 and a leg portion 216 of the outermost trailing link 206. The outer leg portion 220 is bridged by a side bar 214 to an end bar 222 defined at a lateral side of the picket 200. While the structure of the example picket 200 includes a certain level of uniformity and repeating patterns to aid in manufacturing of the picket 200 and construction of a flatwire conveyor belt 100, alternative embodiments may diverge from that shown to, for example, address application-specific requirements and/or goals.

The example picket 200 includes a series of features that provide for interconnecting adjacent pickets 200 with cross-rods 104, and for interfacing with and supporting the top plates 300. When adjacent pickets 200 have been intermeshed, a cross-rod 104 can extend through generally similar openings 224 defined in the edge links 202, the leading links 204, and the trailing links 206. The openings 224 of the example embodiment are not uniformly circular, but are somewhat oval and are positioned to extend through the corners formed between the edge end portion 208, the leading end portion 210, the trailing end portion 212, and respective leg portions 216. Similar openings 226 are formed in the edge bar 222 and are generally axially aligned with the openings 224 formed in the trailing links 206. The form factor of the openings 224, 226 can allow for a desired amount of slack between adjacent pickets 200, generally in the direction of travel D. In addition, the form factor of the openings 224, 226 can be tailored to accommodate a lateral compression of the picket 200 during assembly of multiple pickets 200 to form rows of a flatwire conveyor belt 100, and to account for practical manufacturing tolerances and considerations associated with the installation and assembly of the top plates 300.

The example pickets 200 define other interface features that are tailored to engage and support top plates 300, such that when the flatwire conveyor belt 100 is traveling in a horizontal plane, the top plates 300 establish a generally continuous conveying surface 110 (e.g., see FIG. 1). Each picket 200 defines a series of slots 228 formed in the edge end portion 208, the leading end portion 210, and the trailing end portion 212. In the example embodiment, the slots 228 are generally rectangular with rounded corners and are positioned above a midpoint and closer to the top of the picket 200. The edge end portions 208 are illustrated with a single slot 228 with each of the leading end portions 210 and the trailing end portions 212 defining two laterally spaced slots 228. The example slots 228 can also comprise a single angled slot, one or more circular opening, protrusion, or other form factor configured to interact with the mating form factor provided in the top plate 300 (discussed below). The particular form factor and positioning of the slots 228 can be adapted and/or altered to accommodate application requirements, manufacturing constraints, or other considerations (e.g., the slots 228 may be adapted to interact with a mating top plate 300 to provide a biasing force urging the top plate 300 into engagement with the picket 200). In the example embodiment, and as described below in more detail, the slots 228 formed in the trailing end portion 212 of the trailing links 206 engage with a mating structure of the top plate 300 to define an example picket trailing interface portion of a trailing interface. The trailing interface establishes selective engagement between the picket 200 and the top plate 300 proximate the trailing end of each.

An example leading interface establishes selective engagement between the picket 200 and the top plate 300 proximate the leading end of each, and a respective cross-rod 104. The picket 200 defines openings 230 that can aid in positioning, assembling, and restraining the top plate 300 at an example picket leading portion of the leading interface. The openings 230 are generally cylindrical, axially aligned, and extend through the various leg portions 216 of the edge links 202 and the leading links 204. The example openings 230 can also comprise, for instance, slots, protrusions, and notches, or any other form factor configured to interact with the mating form factor provided on the top plate 300 (discussed below). Another axially aligned set of openings 230 is formed in the edge bars 222 and the trailing links 206. In one embodiment, the openings 230 are generally uniform in form factor and are positioned at a midpoint between the upper and lower bounds of the picket 200.

Each example picket 200 also defines notches 232 that are generally formed in the edge end portions 208 of each edge link 202, the leading end portion 210 of the leading link 204, and the trailing end portion 212 of the trailing link 206. The example notches 232 are formed in the upper portion of the edge links 202, leading links 204, and trailing links 206 and extend partially into respective leg portions 216 (and edge bars 222) to provide clearance for the top plate 300 when the top plate 300 is seated on top of the picket 200. In profile, as shown best in FIG. 5, each notch extends nearly above a portion of a respective, relative opening 224, 226. The form factor and placement of the notches 232 can be adapted for a particular application, such as to accommodate a particular top plate design.

The form factor of the top plates 300 allow for each to be seated atop and interface with a supporting picket 200, while also being captured to a cross-rod 104 installed to hingedly interconnect adjacent pickets 200. The example top plate 300 is shown and described with additional reference to FIGS. 6-10. In one embodiment, the top plate 300 is manufactured and formed from a metallic sheet having a generally uniform thickness. The top plate 300 may be manufactured from other materials and processes; for instance, the top plate 300 can be molded from a polymeric material. In addition, while the top plates 300 are shown as uniform modular components, it is appreciated that top plates of varying forms may be used when beneficial for a particular application.

The example top plate 300 defines a generally planar transport surface 302 that includes an array of perforations 304, which can allow for drainage and airflow through the transport surface 302. The transport surfaces 302 of a plurality of top plates 300 can combine to collectively define the conveying surface 110. The perforations 304 can take on a variety of orientations, sizes, and form factors (see, for instance, FIG. 22), or be absent (shown, for example, in FIGS. 20-21) such that the transport surface 302 is generally continuous. In addition, in other embodiments, the transport surface 302 can provide a textured or contoured surface that may improve frictional engagement and/or positive structural engagement between the transport surface 302 and a particular product to be conveyed. The top plates 300 can further include or define application-specific structures (e.g., resilient fingers, dividers, fights, etc.).

The example top plate 300 engages the underlying picket 200 near a leading end 306 at the leading interface and near a trailing end 308 at the trailing interface. The leading end 306 also includes structures to engage a cross-rod 104 used to pivotally interconnect adjacent rows of pickets 200. The generally rectangular transport surface 302 of the top plate 300 is formed with downwardly extending side skirts 310, and includes a pair of arms 312 near the leading end 306 and an arcuate tail 314 near the trailing end 308. The arms 312 angle downward from the transport surface 302 at a curved portion 316 to a lower portion 318, such that the lower portion 318 is skewed relative to the transport surface 302. A tab 320 is formed at an orientation that generally extends orthogonally to the lower portion 318 in a direction toward the trailing end 308 and generally parallel with the side skirts 310. Each lower portion 318 of the respective tab 320 includes an outer side 328 that skews laterally inward toward the centerline C of the top plate 300 (illustrated in FIG. 9). Each tab 320 includes an opening 322 and an ear 324, which includes an arcuate upper end 326 that extends away from a centerline C of the top plate 300. As with the openings 230, the ears 324 can comprise a variety of form factors (e.g., protrusions, recesses, inserts, etc.) that are configured to mate and interface with the form factor defined by the picket leading interface portion (e.g., the example openings 230). The openings 322 are somewhat elongated and are sized and positioned to accommodate the cross-rod 104 during use; therefore, in the example embodiment, the top plates 300 are engaged with the pickets 200 prior to inserting the cross-rods 104 to interconnect adjacent rows of top plates 300 and supporting pickets 200.

Figure 7:
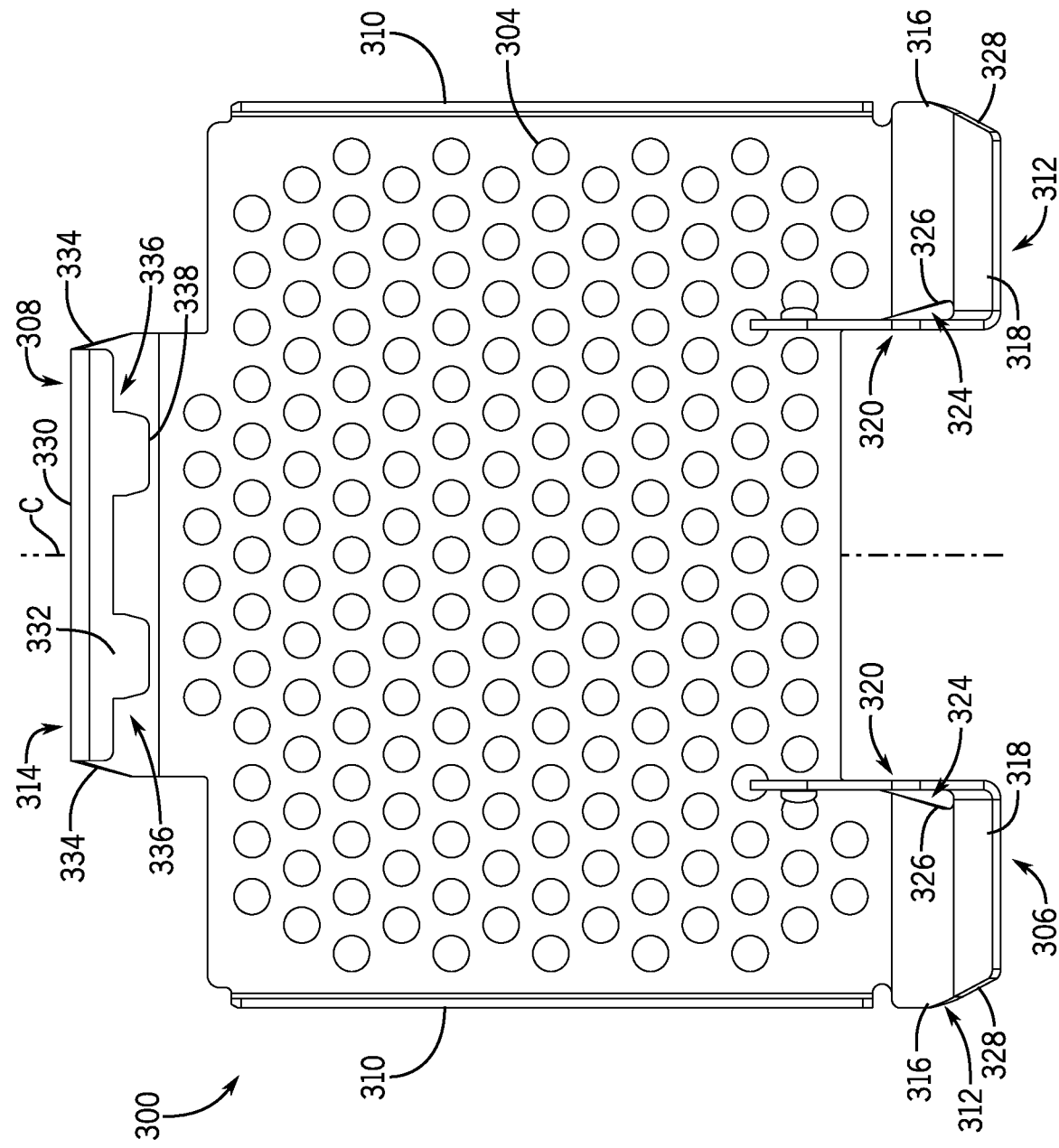
FIG. 7 is a bottom plan view of the example top plate.

The tail 314 near the trailing end 308 curves downward and away from the transport surface 302, ultimately curving back toward the leading end 306 of the top plate 300 at a trailing edge 330 to define generally horizontal lip 332. As best illustrated in FIG. 7, the example tail 314 includes sides 334 that skew inward towards the centerline C of the top plate 300. In the example top plate 300, a pair of laterally spaced tabs 336 extend from the lip 332 toward the leading end 306. Each tab 336 slightly tappers toward a tip 338, and the tabs 336 comprise a portion of the example top plate trailing interface portion of the trailing interface between the picket 200 and the top plate 300. The tabs 336 can take on a variety of form factors (e.g., openings, slots, grooves, protrusions, nibs, inserts, etc.), provided the top plate trailing interface portion and the picket trailing interface portion are adapted to interact at the trailing interface between the picket 200 and the top plate 300 to interface the top plate 300 and the picket 200.

Figure 8:
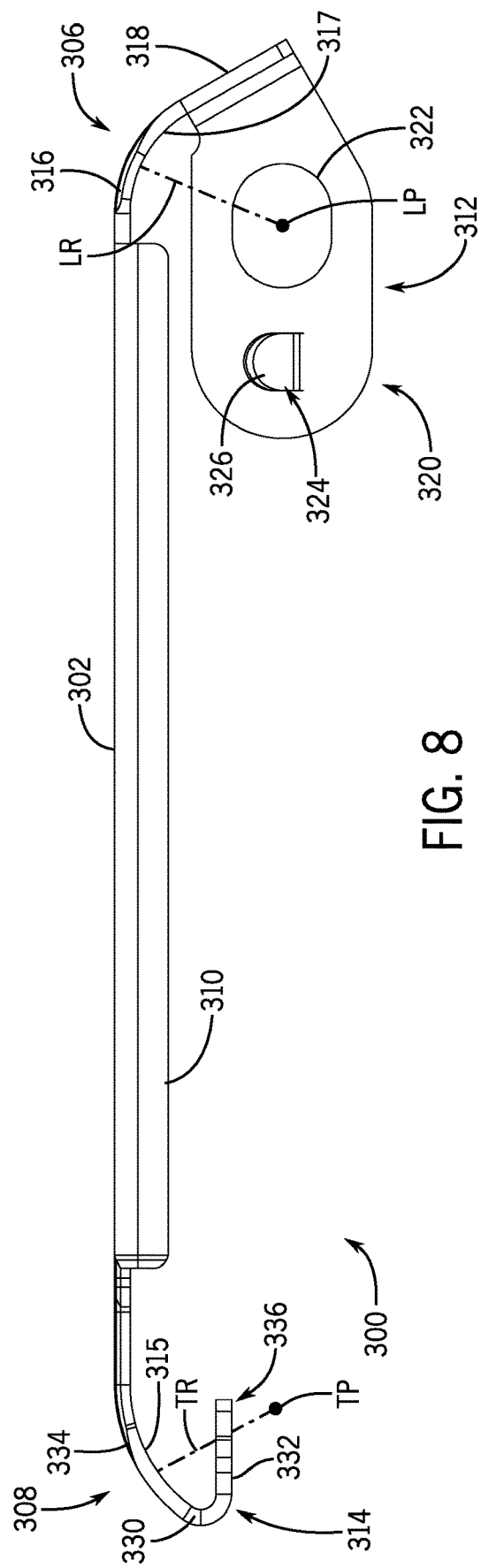
FIG. 8 is a side elevation view of the example top plate.
Figure 9:
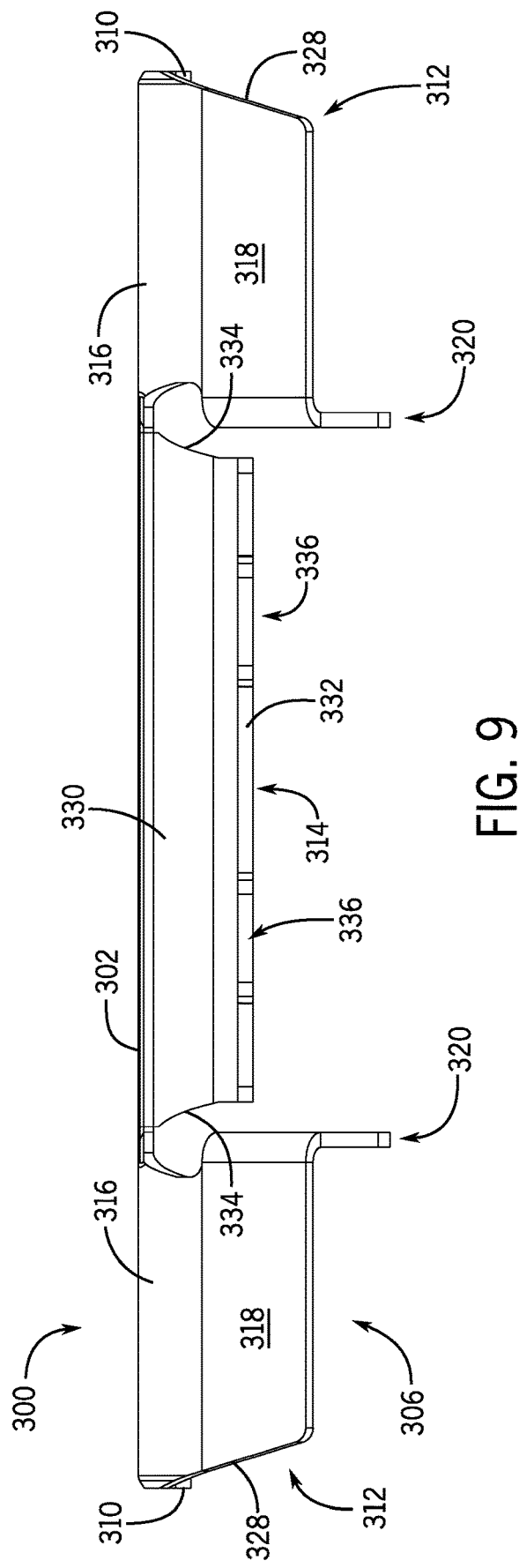
FIG. 9 is a front elevation view of the example top plate.
Figure 10:
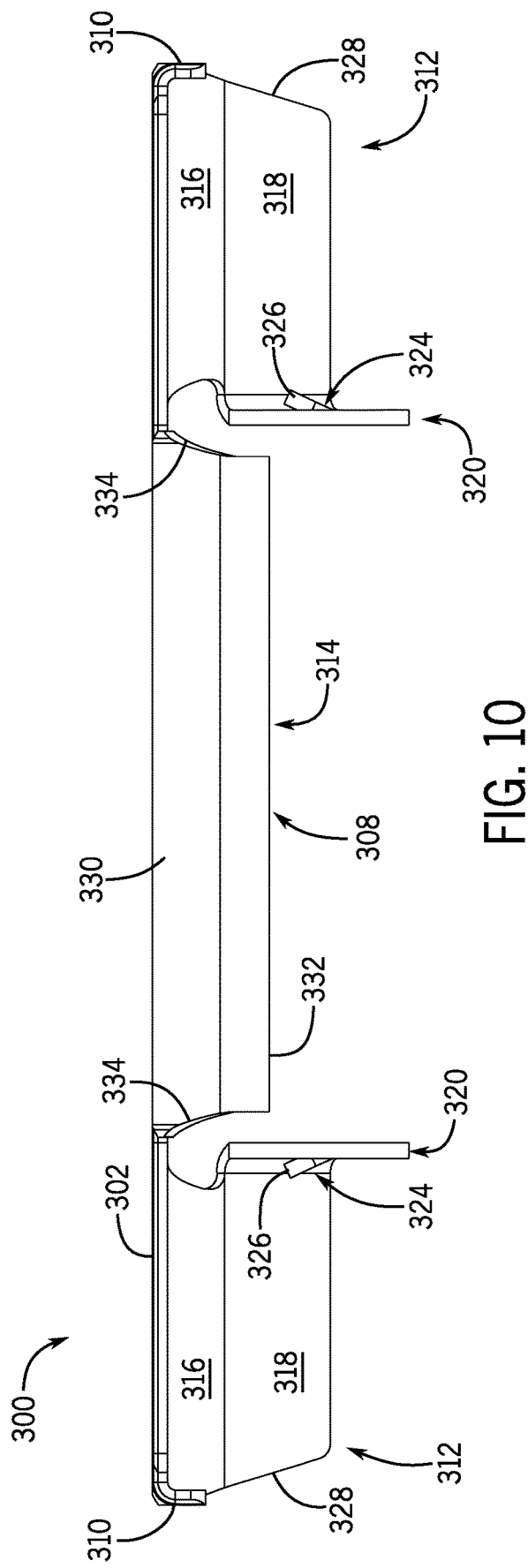
FIG. 10 is a rear elevation view of the example top plate.

With specific reference to FIG. 8, the form factor of the top plate 300 includes features that generally maintain a desired spacing and orientation between adjacent top plates 300 during use. The curved portion 316 defines an arcuate segment 317 that has a leading radius of curvature LR extending from a leading pivot axis LP, and the tail 314 defines another accurate segment 315 that has a trialing radius of curvature TR extending from a trailing pivot axis TP. The curvature of these segments 315, 317 (relative to the leading and trailing pivot axes generally defined by the orientation of the leading and trailing cross-rods 104) maintains a nearly constant spacing between adjacent top plates 300 as they traverse and pivot about the leading pivot axes LP and the trailing pivot axes TP. In addition, these features maintain a consistent and relatively smooth transition between adjacent top plates 300.

Figure 11:
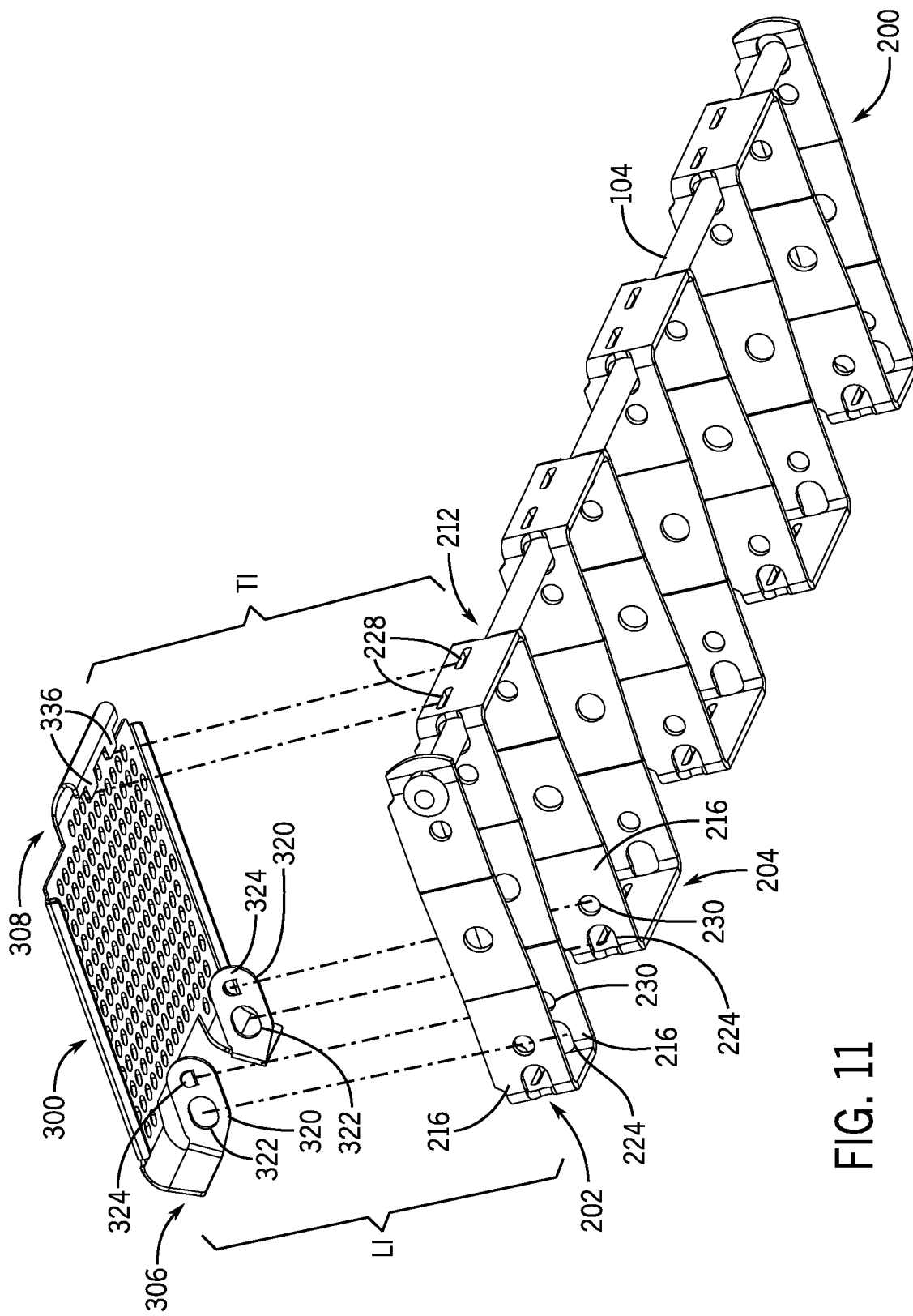
FIG. 11 is a bottom isometric, exploded view of a single example picket and a single example top plate shown in FIG. 1.
Figure 12:
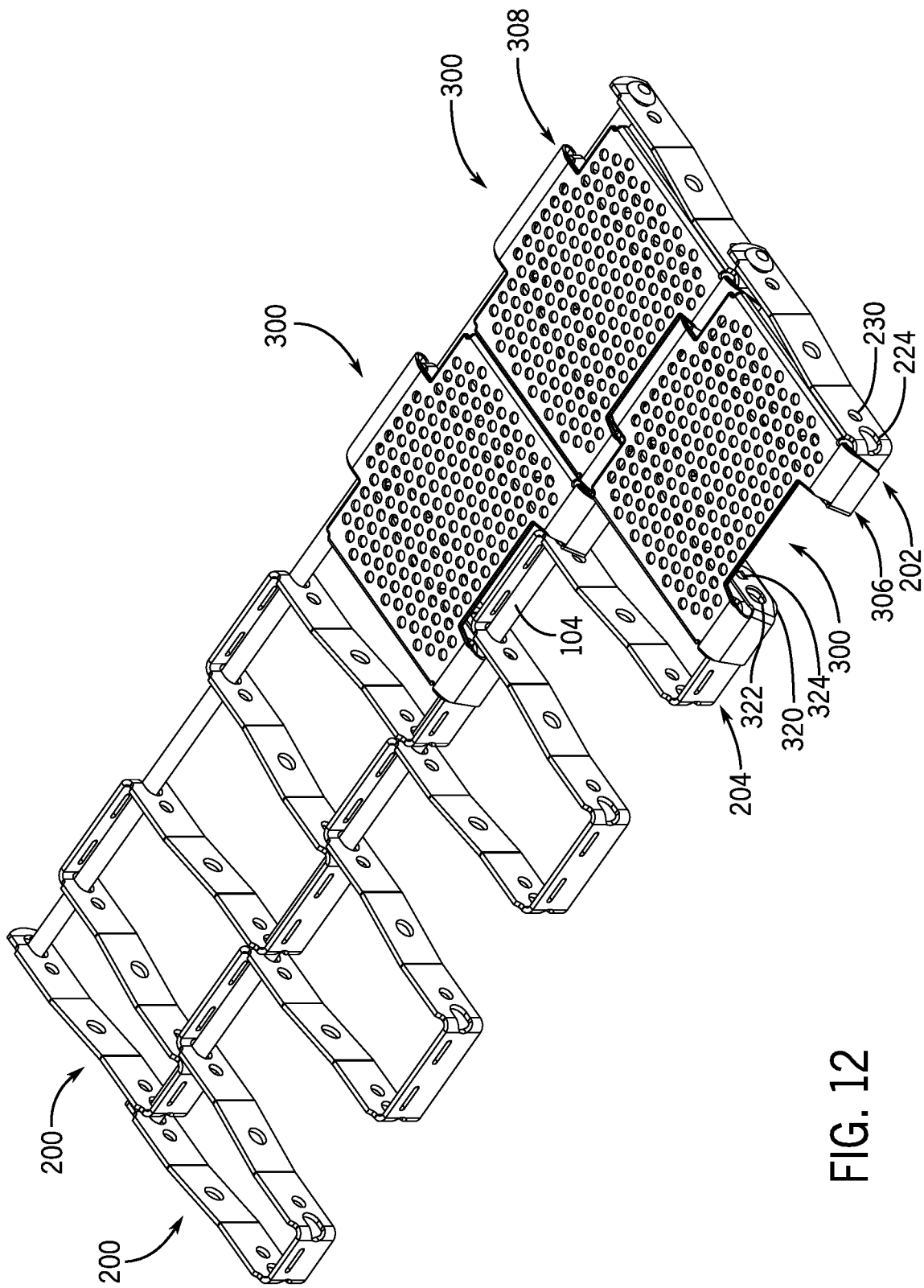
FIG. 12 is a top isometric view of a partial assembly of the example pickets and the example top plates shown in FIG. 1.
Figure 13:
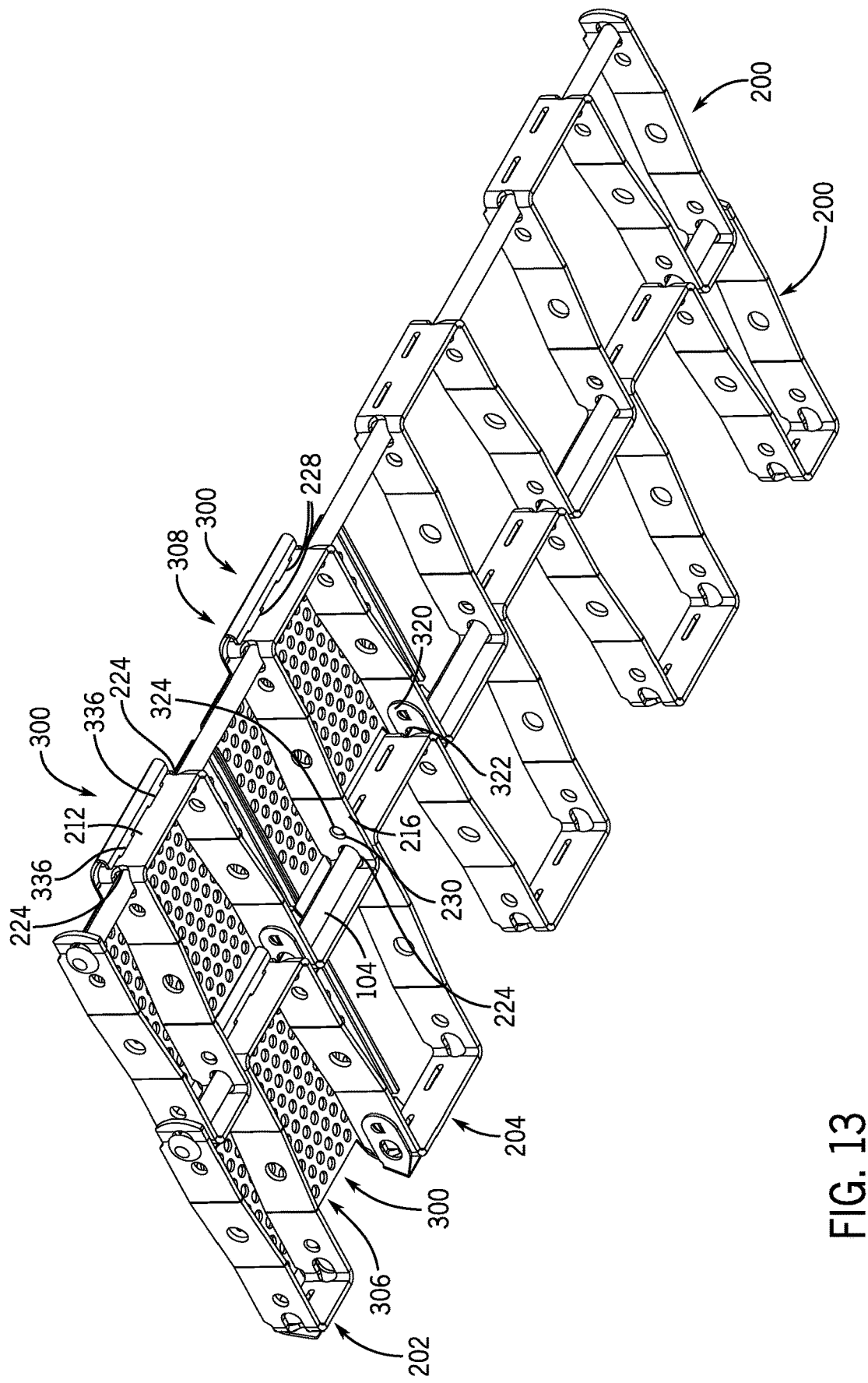
FIG. 13 is a bottom isometric view of the partial assembly.
Figure 14:
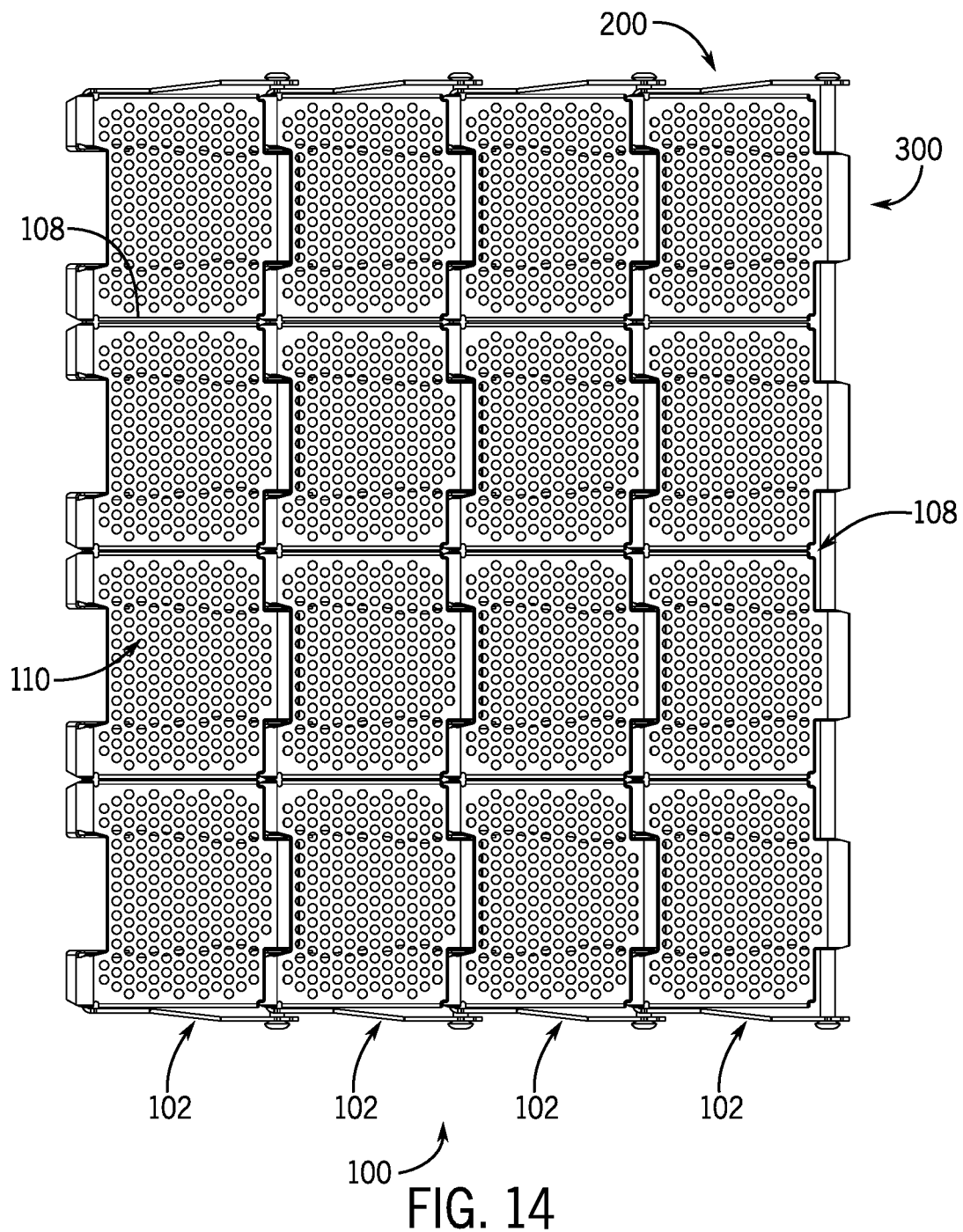
FIG. 14 is a top plan view of the portion of the example flatwire conveyor belt shown in FIG. 1.
Figure 15:
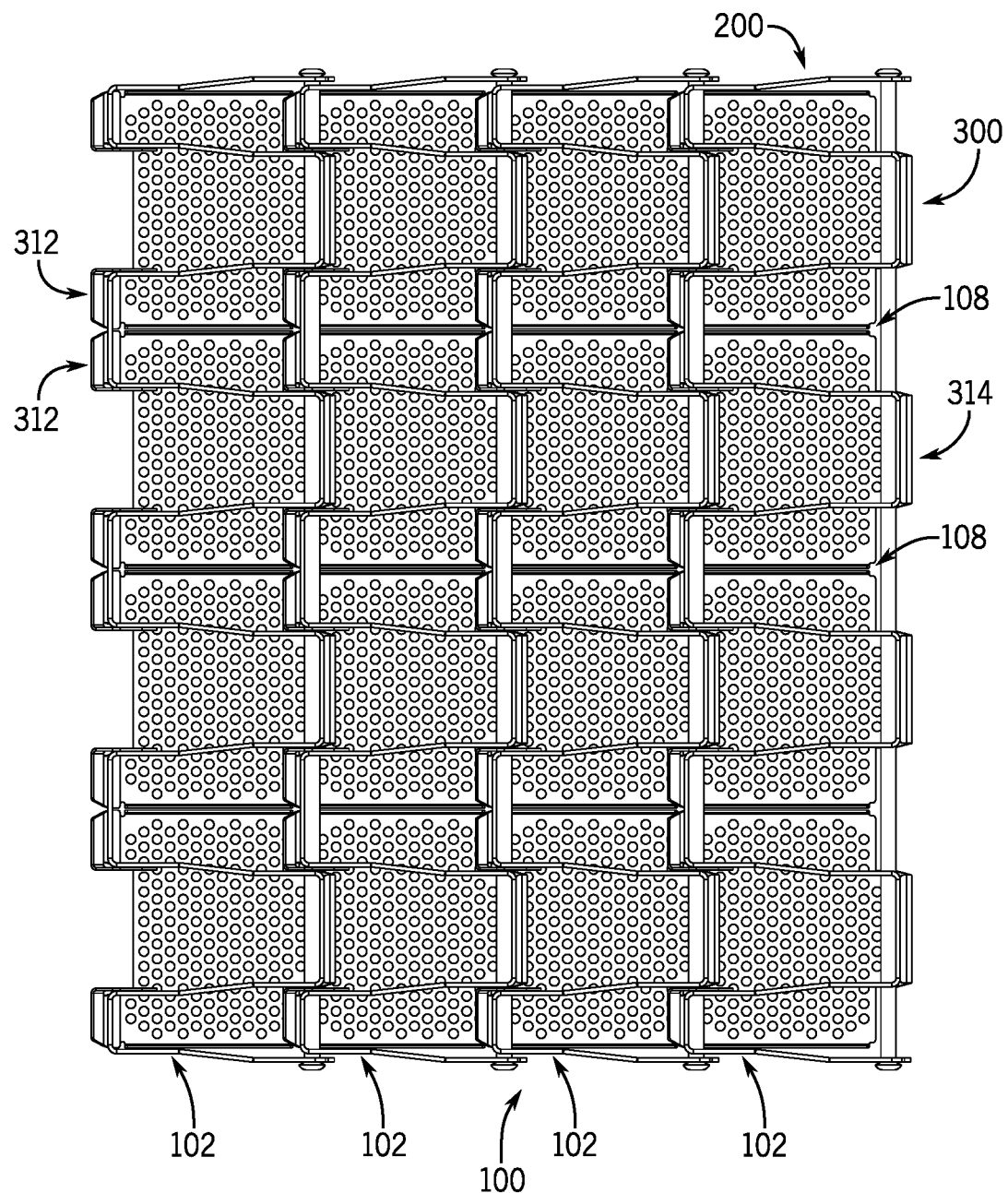
FIG. 15 is a bottom plan view of the portion of the example flatwire conveyor belt.
Figure 16:
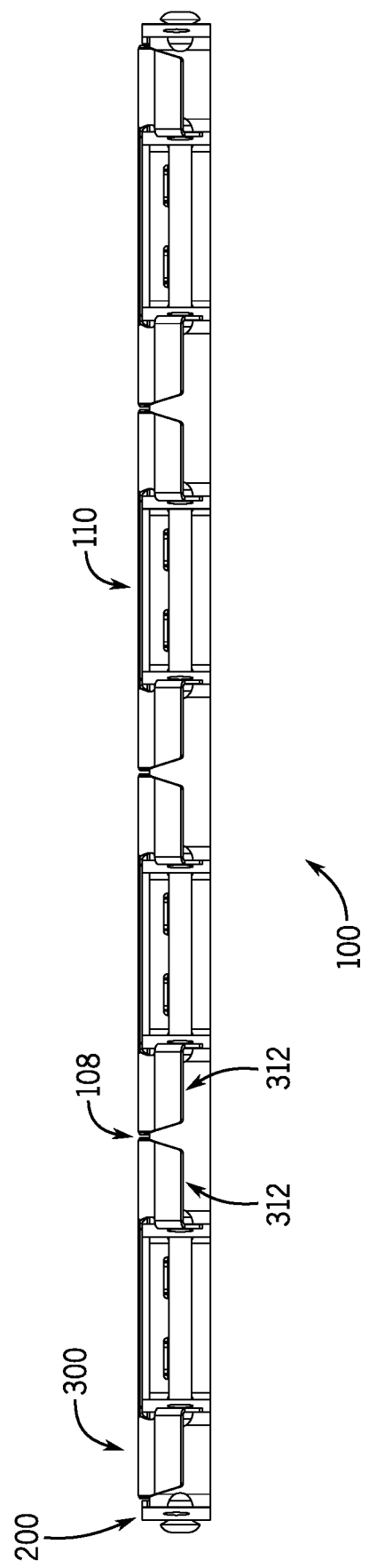
FIG. 16 is a front elevation view of the portion of the example flatwire conveyor belt.
Figure 17:
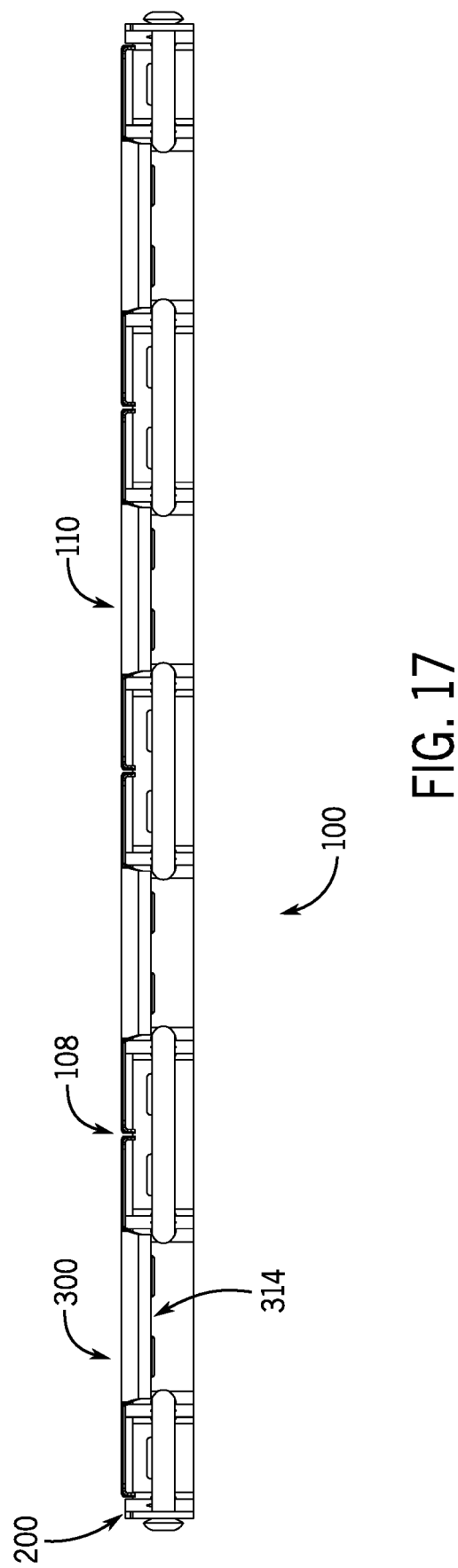
FIG. 17 is a rear elevation view of the portion of the example flatwire conveyor belt.
Figure 18:
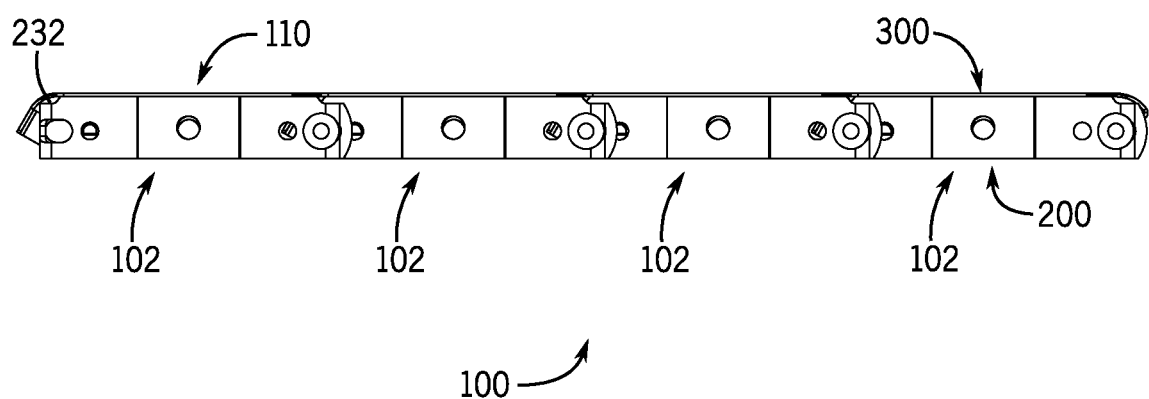
FIG. 18 is a side elevation view of the portion of the example flatwire conveyor belt, with the opposite side being a mirror image.

The example interface and engagement between the picket 200 and top plate 300 is described with additional reference to FIGS. 11-13. The example picket 200 and the example top plate 300 are configured to interface at a leading interface and at a trailing interface (annotated in FIG. 11 as LI and TI, respectively). Specifically, the leading interface includes a picket leading portion and a top plate leading portion that are both adapted to establish cooperating form factors that mate the picket 200 and the top plate 300 near leading ends. As shown in the example configuration, the picket 200 includes an example picket leading portion defining openings 230 that establish a form factor adapted to interface with an example top plate leading portion of the top plate 300 defining ears 324. In addition or alternatively, the example leading interface can include the cooperation between the openings 224 of the picket 200, the openings 322 in the top plate 300, and the assembly of the cross-rod 104 through the openings 224, 322. Similarly, the trailing interface includes a picket trailing portion and a top plate trailing portion that are both adapted to establish cooperating form factors that mate the picket 200 and the top plate 300 near trailing ends. As shown in the example configuration, the picket 200 includes an example picket trailing portion defining slots 228 that establish a form factor adapted to interface with an example top plate trailing portion of the top plate 300 defining tabs 336. Given the benefit of this disclosure, one of ordinary skill in the art will appreciate the various structures and form factors that can be employed to implement the interface concepts that can inhibit separation of top plates from pickets.

To mate the example top plate 300 with the example picket 200, the top plate 300 is generally aligned as shown in FIG. 11 (as annotated by engagement lines). The tabs 336 on the trailing end 308 of the top plate 300 are aligned for insertion into the slots 228 formed in the trailing end portions 212 of the trailing link 206. The tapered form factor of the tabs 336 can be configured to securely engage a receiving form factor defined by the structure of the slots 228. Turning to the leading end 306 of the top plate 300, the opening 322 in one tab 320 is generally aligned with the opening 224 formed near the leg portion 216 of the edge link 202, and the other opening 322 of the other tab 320 is generally aligned with the opening 224 formed near the leg portion 216 of the leading link 204. Similarly, the ear 324 of one tab 320 is generally aligned with the opening 230 formed in the leg portion 216 of the edge link 202, and the other ear 324 of the other tab 320 is generally aligned with the opening 230 formed in the leg portion 216 of the leading link 204. The contour of the ears 324 and the respective upper ends 326 are inserted by slight elastic deformation of, for instance, one or more of the picket 200, the ear 324, and the tab 320. Once engaged, the upper ends 326 of the ears 324 interfere with the boundary of the opening 230 to inhibit unintentional removal of the top plate 300, and can abate noise caused by excess relative movement of the top plate 300. In addition, the interaction between and relative placement of the ears 324 and the corresponding openings 230 establish positioning features that aid assembly of the top plates 300 to the pickets 200 by, for example, aligning the openings 230 in the picket 200 with the openings 322 in the top plate 300 (discussed below) to readily receive the cross-rod 104.

When the top plate 300 of FIG. 11 is installed, the top plate 300 extends between and generally covers the edge link 202, the laterally adjacent trailing link 206, and approximately half of the laterally adjacent leading link 204 (best illustrated in FIGS. 12 and 13). With specific reference to FIGS. 12 and 13, another top plate 300 can be similarly assembled by again aligning the interconnecting interface features of the picket 200 and the additional top plate 300.

With the desired top plates 300 secured to the appropriate pickets 200, the cross-rods 104 can be aligned with the respective openings 224, 226 in the edge links 204, leading links 206, and trailing links 208 of the pickets 200, and openings 322 in the tabs 320 of the top plates 300. In other embodiments, the pickets 200 and top plates 300 can be modified such that the top plate 300 is secured to the pickets 200 by tabs 336 on the trailing end 308 and by similar tabs on the leading end 306. For instance, tabs on the leading end 306 may extend from the lower portion 318 of the top plate 300 and extend into the slots 228 formed in the edge link 202 and the leading links 204.

A portion of the flatwire conveyor belt 100 illustrating four rows 102 is further shown in FIGS. 14-18, and various additional features of the pickets 200 and the top plates 300 are illustrated. In one embodiment, the top plates 300 are sized to provide a lateral space or gap 108 between laterally adjacent top plates 300. This provides, for instance, space to accommodate lateral compression of the underlying pickets 200 that can occur during assembly of the flatwire conveyor belt 100. The gap 108, however, can be sized to reduce the potential for products being conveyed to undesirably interact with the gap 108. Where a relatively smooth, continuous conveying surface 110 is desired, the notches 232 formed in the edge end portions 208 of each edge link 202, the leading end portion 210 of the leading link 204, and the trailing end portion 212 of the trailing link 206 can accommodate a respective top plate 300, such that the top plate 300 is seated in preferred orientation relative to other top plates 300 and may be positioned generally directly on the picket 200.

In addition, several contours and form factors of the pickets 200 and the top plates 300 enhance hinging of the adjacent rows 102. For instance, the contours of the arms 312 at the leading end 306 and the tail 314 at the trailing end 308 can be configured to establish desired clearance for uninhibited rotation within a practical range of operation of the flatwire conveyor belt 100.

In the example embodiment, each row 102 is generally identical and comprised of pickets 200 and top plates 300 of substantially similar form factors, respectively. In addition, the picket 200 and the top plate 300 include various contours provided to enhance manufacturability from strip/sheet material using, for instance, die cutting, stamping, and press forming processes. Depending on the form factor and envelope constraints for a particular flatwire conveyor belt application, the spacing and construction of the picket and top plate can be adapted accordingly. For example, top plates of varying form factor can be provide to establish a brick-lay pattern having offset top plate placement between adjacent rows, such that successive rows do not combine to establish continuous gaps or contours. In one example, a combination of top plates of discrete lateral dimensions (e.g., 6 inches in lateral width and 3 inches in lateral width) can be configured to establish a brick-lay pattern.

Figure 19A:
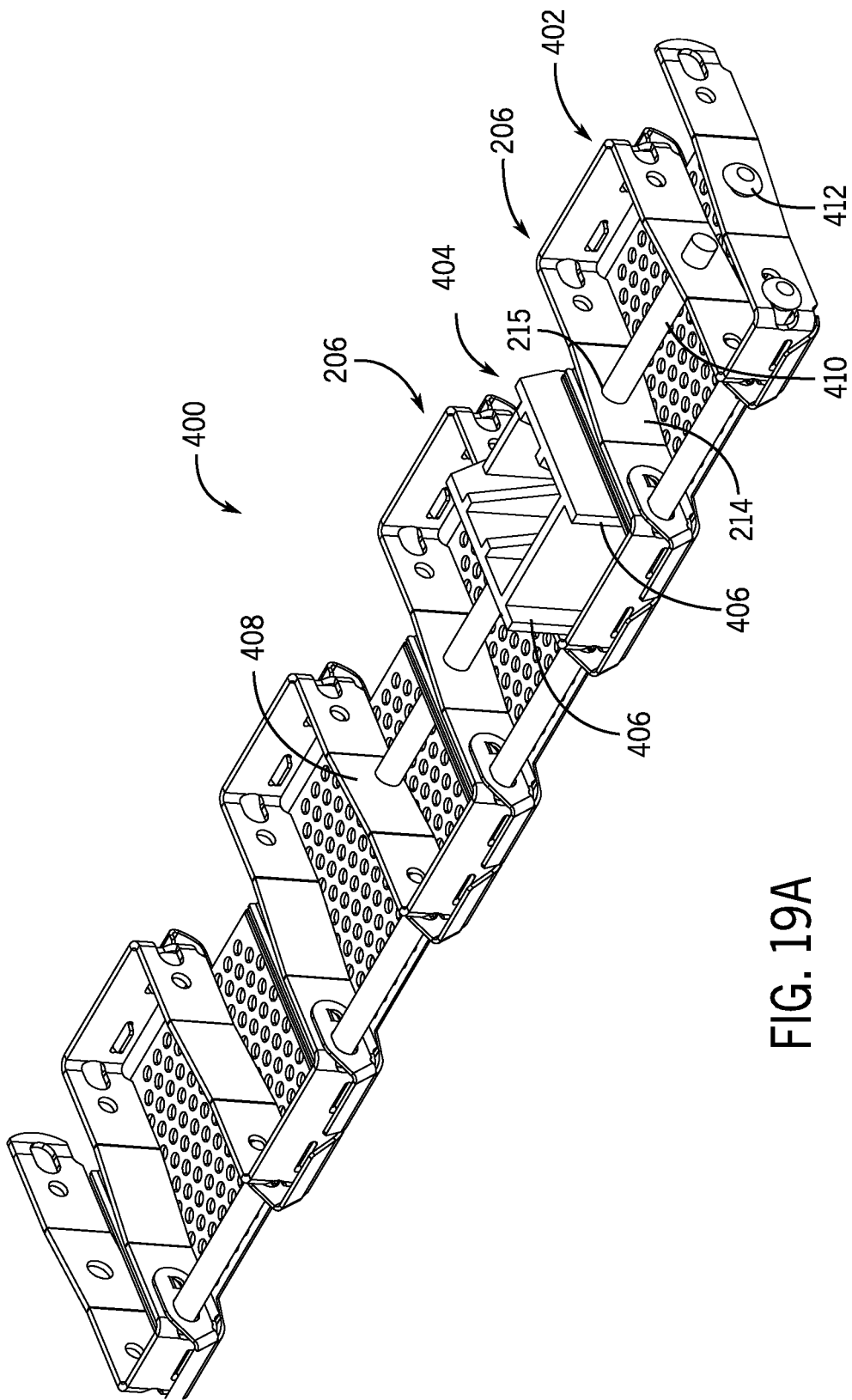
FIGS. 19A and 19B are bottom isometric views of an alternative embodiment of an example flatwire conveyor belt incorporating an example positioning element capable of use with guide systems.
Figure 19B:
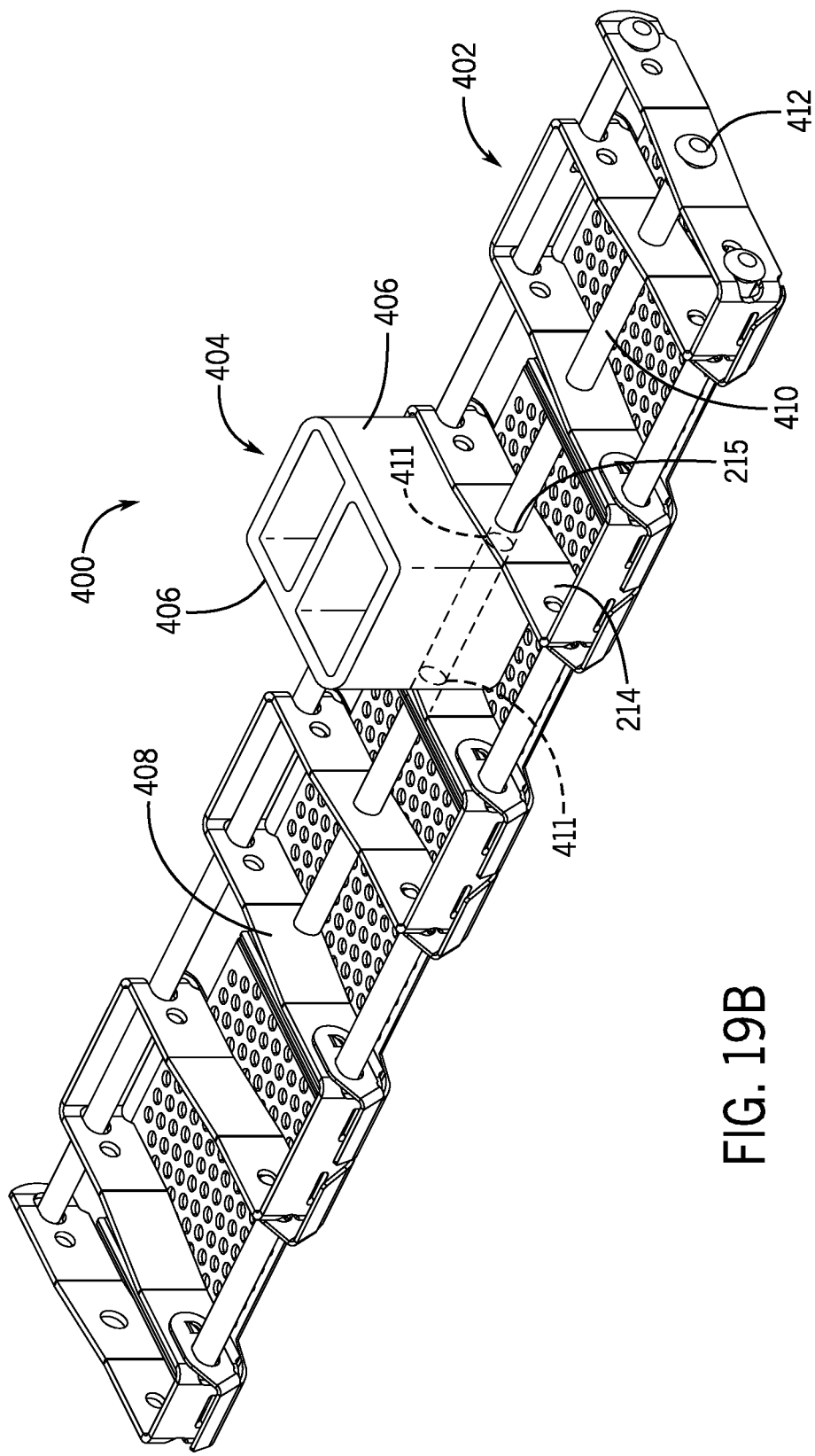

An alternative embodiment of an example portion of flatwire conveyor belt 400 is illustrated in FIGS. 19A and 19B. While many similarities to the flatwire conveyor belt 100 are present, a difference exists in that a picket 402 has been modified to accommodate and restrain a portion of a guide system. For example, the guide system, such as the Positrack system employed by Rexnord Corporation of Milwaukee, Wis., can include a track or rail (not shown). The flatwire conveyor belt 400 includes a mating positioning element 404 that is configured to interact with the track or rail during operation of the flatwire conveyor belt 400. The example positioning element 404 includes various surfaces, such as lateral sides 406, which can be configured to ride along or engage with portions of the track or rail to direct, limit, or at least partially restrain undesired movement of the flatwire conveyor belt 400.

Figure 3:
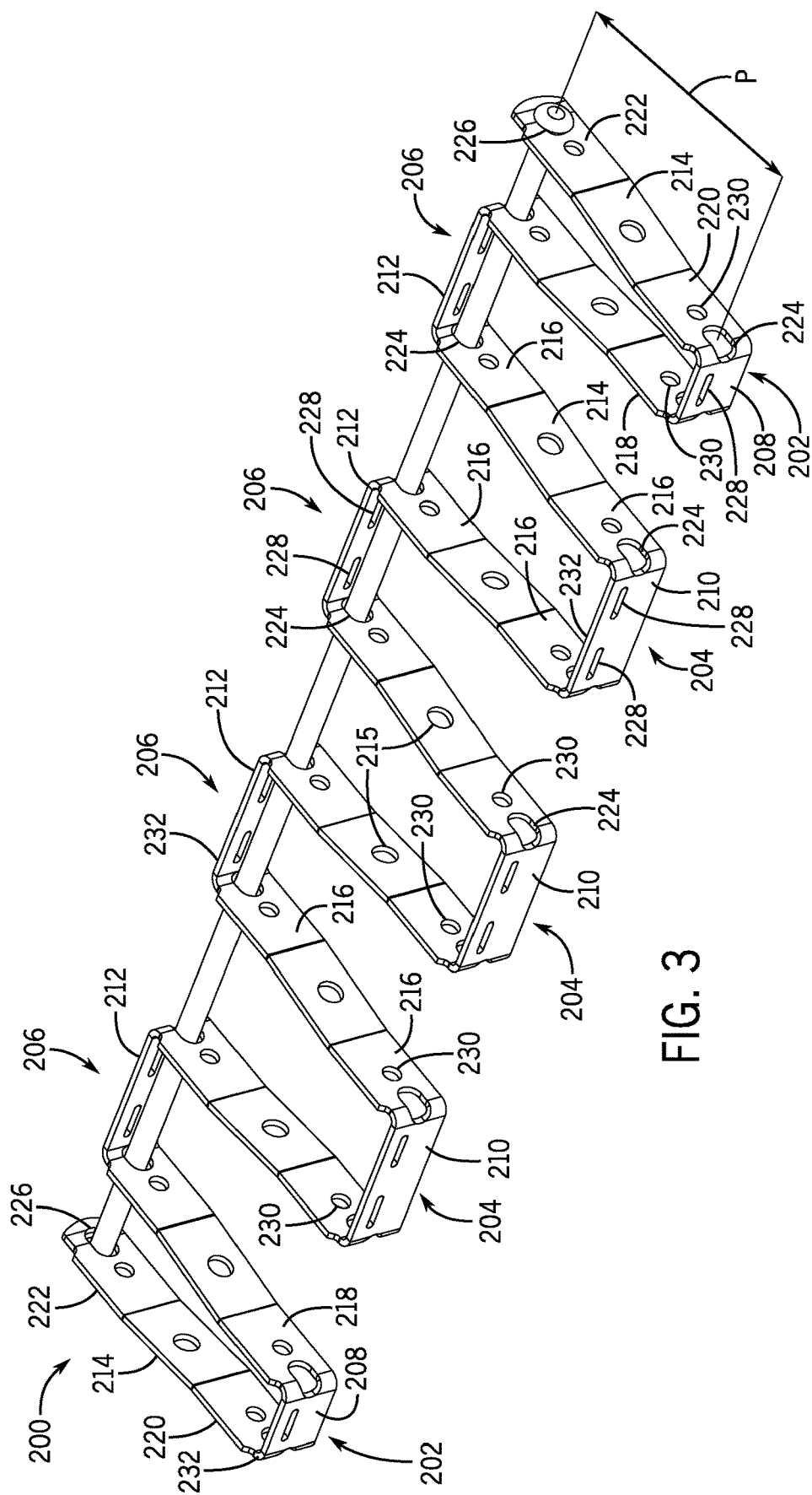
FIG. 3 is a top isometric view of an example picket shown in FIG. 1.
Figure 4:
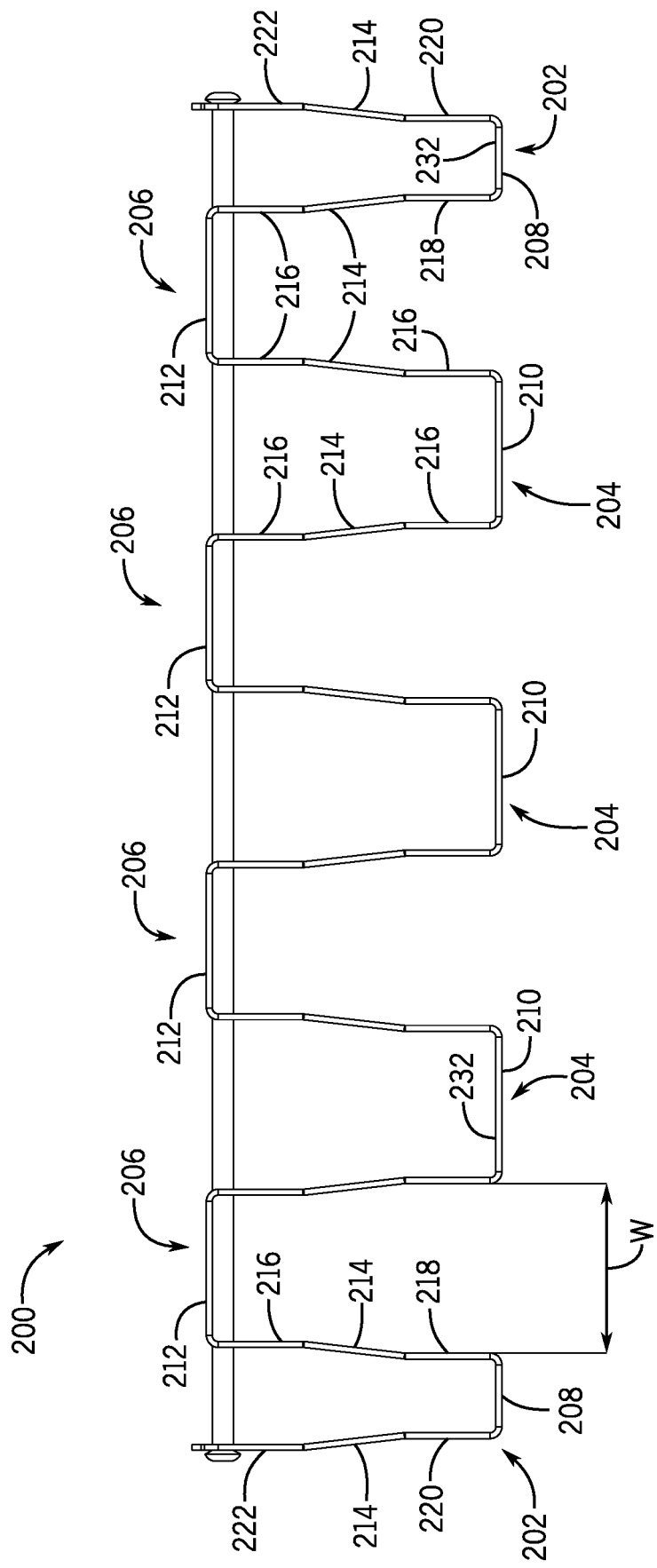
FIG. 4 is a top plan view of the example picket.
Figure 5:
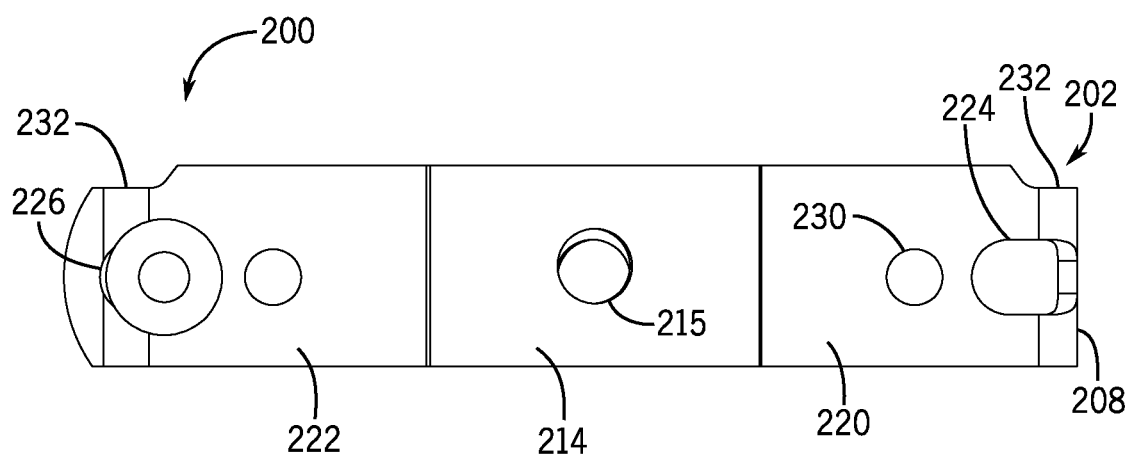
FIG. 5 is a side elevation view of the example picket, with the opposite side being a mirror image.
Figure 6:
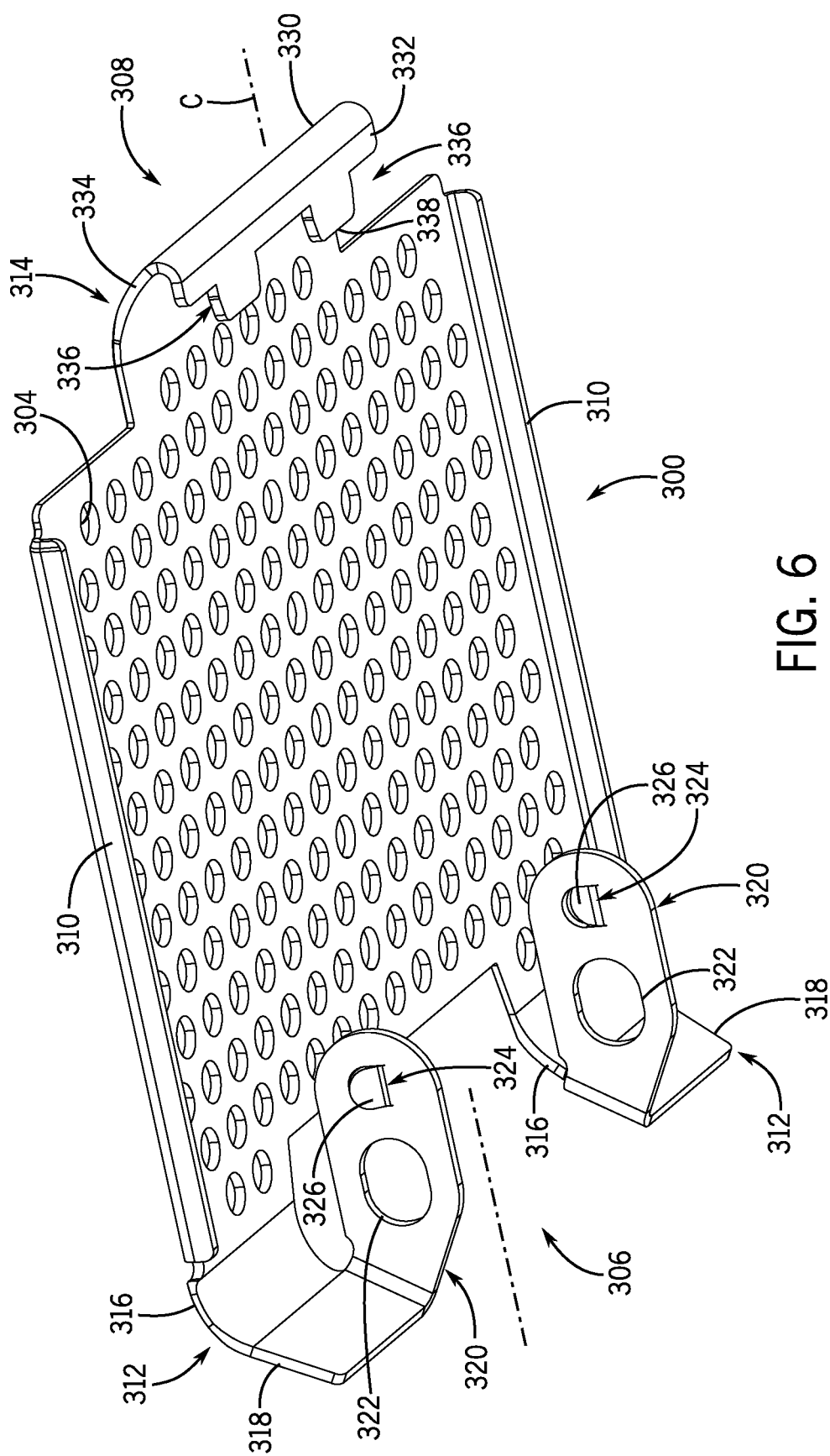
FIG. 6 is a bottom isometric view of an example top plate shown in FIG. 1.

With additional reference to FIGS. 3 and 5, the form factor of the example picket 402 is similar to picket 200. Picket 402 includes a series of openings 215 that are formed through select ones of the side bars 214. While the axis of each opening 215 is generally aligned, in one embodiment, the openings 215 formed in the respective side bar 214 of the end links 202 may be positioned slightly above the openings 215 formed in the remaining side bars 214 (shown best in FIG. 5). With specific reference to FIGS. 19A and 19B, the picket 402 differs in that at least side bar 408 does not include any opening (i.e., similar to openings 215). Therefore, the example positioning element 404 can be seated between trailing links 206 and a guide rod 410, which is sized accordingly, can be inserted into the openings 215, through cylindrical channel or openings 411 in or through the positioning element 404, and generally abutted against side bar 408. This construction effectively captures the positioning element 404 with the picket 402. To inhibit the guide rod 410 from undesirable removal, a rivet 412 (or other structure, such as a plug, a clip, etc.) can be used to block at least a portion of the outermost opening 215 formed in the edge link 202.

Figure 20:
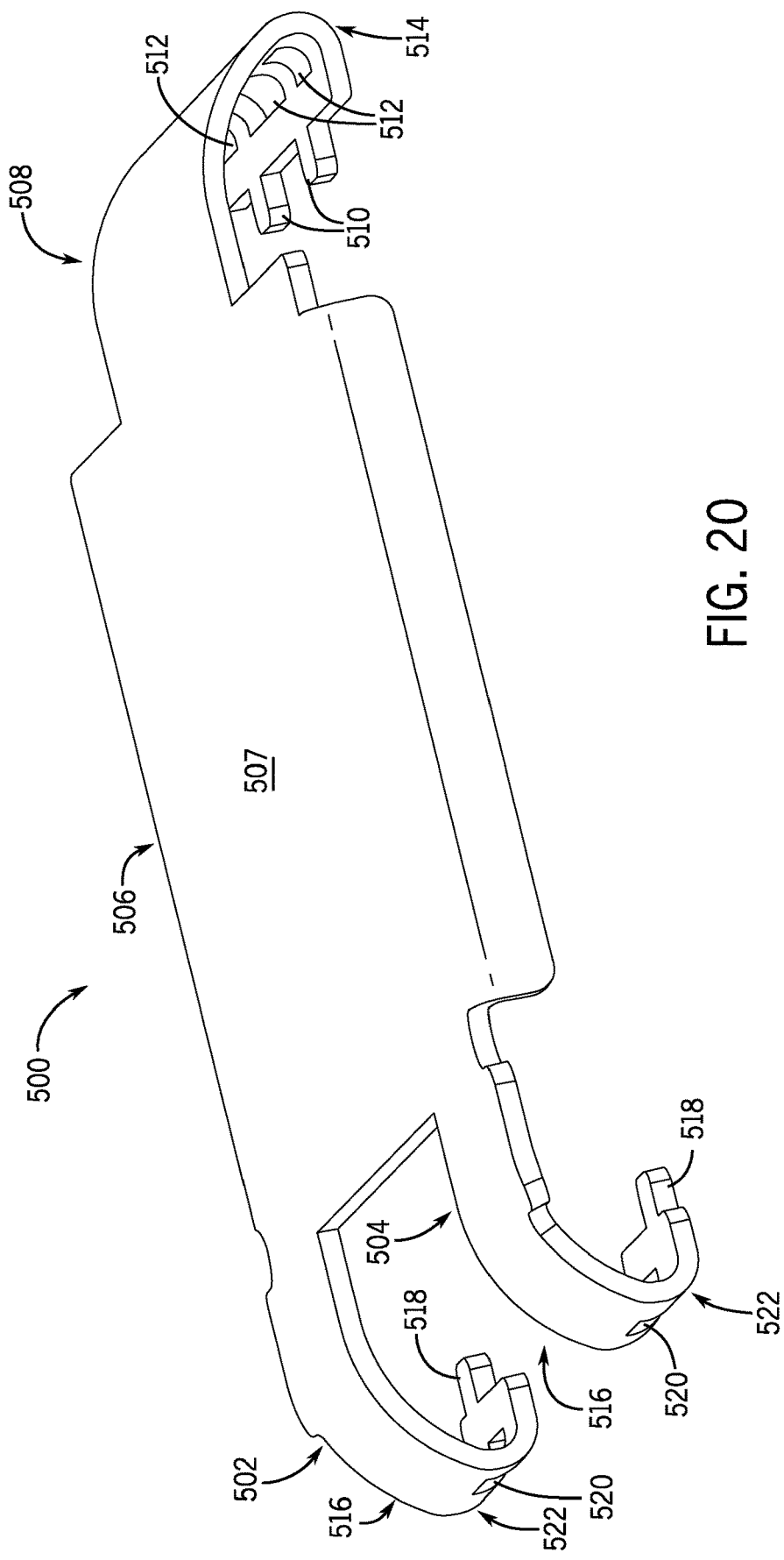
FIG. 20 is a top isometric view of another example top plate.
Figure 21:
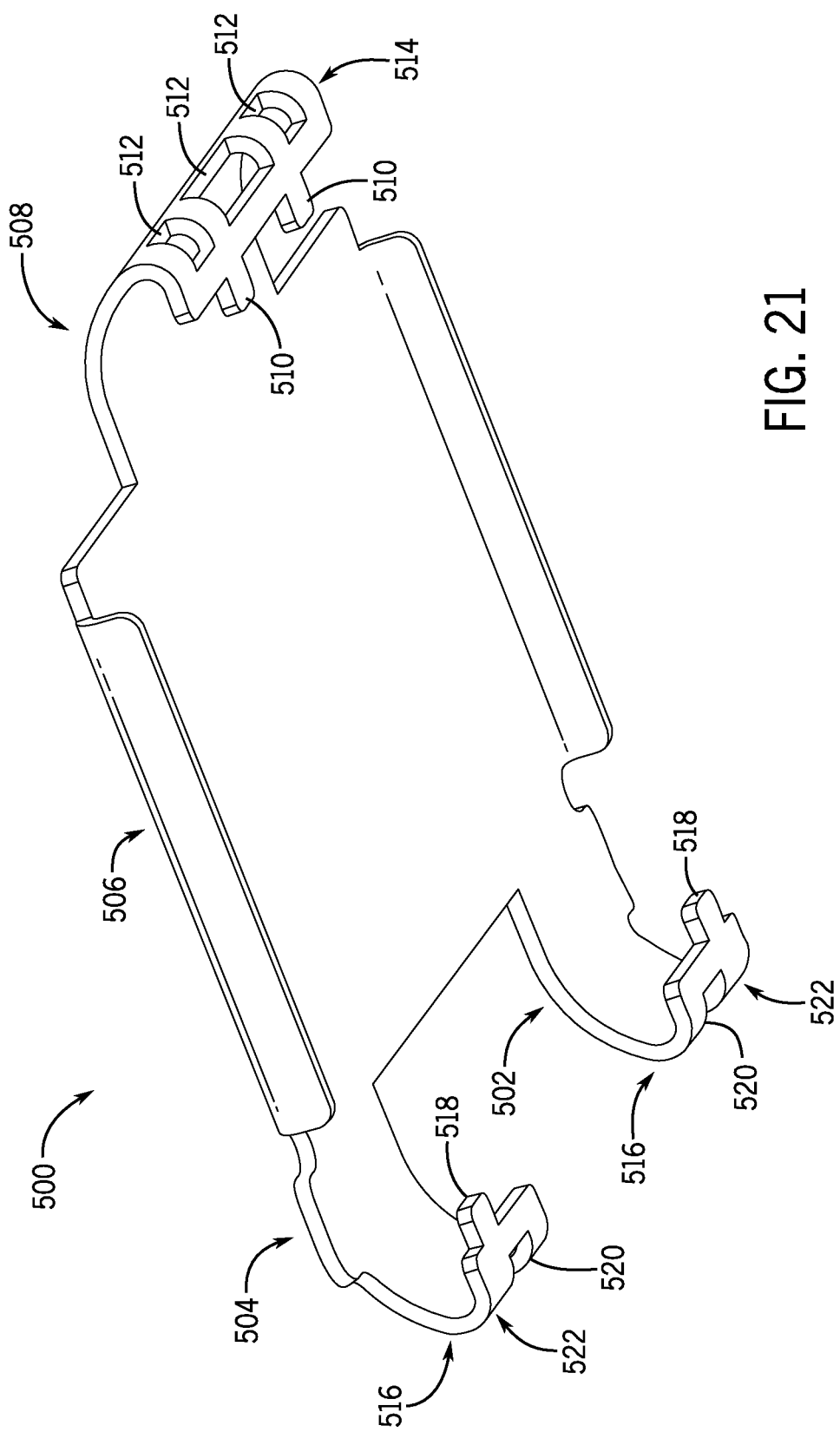
FIG. 21 is a bottom isometric view of the example top plate shown in FIG. 20.

An alternative top plate 500 is illustrated in FIGS. 20 and 21. While the top plate 500 is similar to the top plate 300, various differences are shown. The top plate 500 includes leading arms 502, 504 that extend from a main body 506 in a leading direction, and a single trailing tail 508 that extends from the main body 506 in a trailing direction. The main body 506 includes a generally continuous, planar transport surface 507. Similar to the top plate 300, the tail 508 curves downward from the main body 506 and terminates in a pair of laterally spaced tabs 510. The tabs 510 are configured to interface with mating slots formed in a supporting picket (e.g., slots 228 formed in the trailing end portion 212 of the picket 200 shown in FIG. 11). The tail 508 further includes a series of openings 512 formed along a trailing end 514.

The leading end of the top plate 500 differs somewhat from the top plate 300. Each arm 502, 504 includes a curved portion 516 that extends from the main body 506 and downward to terminate in a leading tab 518. The leading tabs 518 are generally rectangular in form factor and extend from distal ends of the arms 502, 504 toward the tail 508. The leading tabs 518 are configured to engage mating slots formed in the leading end portion of a picket, such as the slots 228 formed in the leading end portion 210 of the picket 200 (show in FIG. 3). The arms 502, 504 also include a series of openings 520 formed along a leading end 522.

The alternative top plate 500 engages the underlying picket (e.g., picket 200) at a leading interface and at a trailing interface. In particular, the tabs 510 of the tail 508 are engaged with respective slots 228 formed in the trailing end portion 212 of the picket 200, and the leading tabs 518 are engaged with respective slots 228 formed in the leading end portion 210 of the picket 200. The top plate 500 and/or the picket (e.g., picket 200) may be elastically deformed or flexed to allow the top plate 500 to be aligned and releasably engaged with the underlying picket 200. Given the benefit of this disclosure, one skilled in the art will appreciate the various interface form factors available to implement the fundamental concepts.

Figure 22:
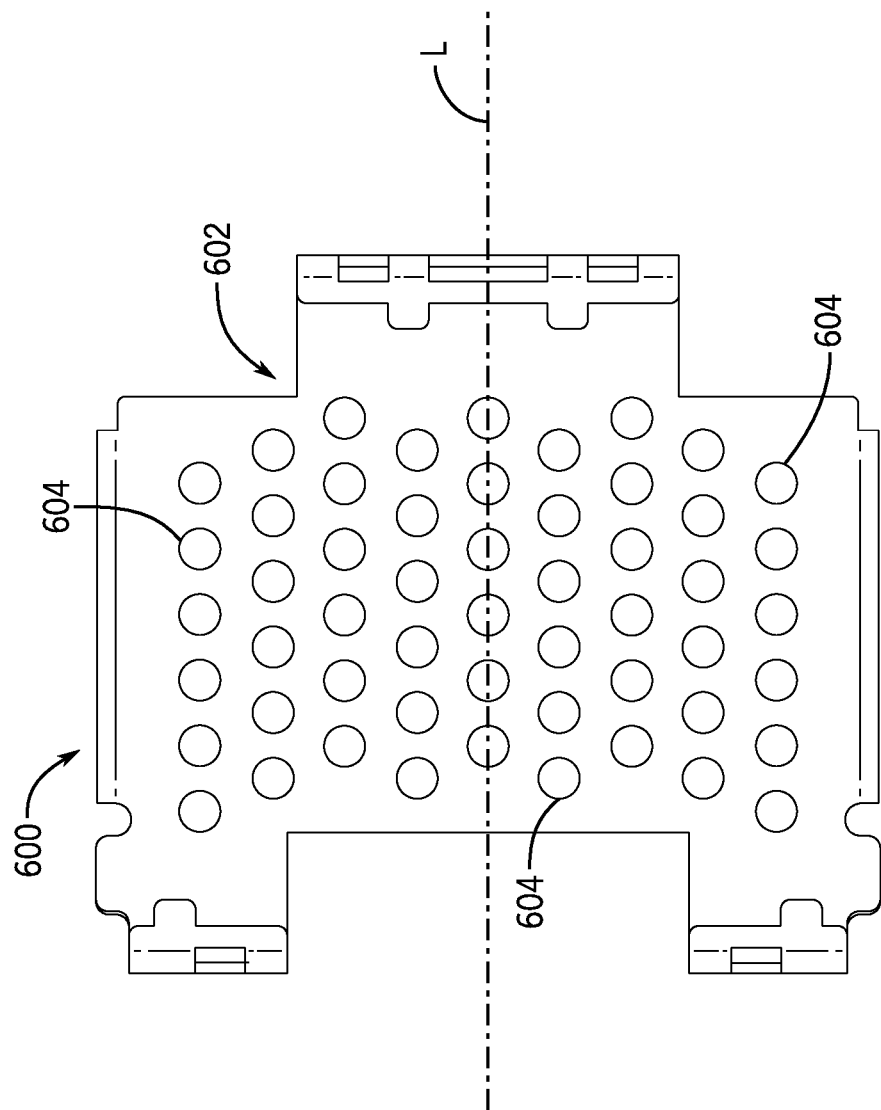
FIG. 22 is a bottom plan view of a further example top plate.

Another alternative top plate 600 is illustrated in FIG. 22. The top plate 600 defines a main body 602 with an array of perforations 604 that extend through the main body 602 between a transport surface and an underside. Each perforation 604 is generally cylindrical and the array of perforations 604 is generally mirrored about line L. In other embodiments, perforations may be non-uniform, both in individual form factor and/or in relative position on the top plate 600. One skilled in the art will understand the various alternatives that fall within the purview of the disclosed concepts.

FIG. 23 illustrates another flatwire conveyor belt 700 in accordance with one example embodiment. The flatwire conveyor belt 700 is similar to the flatwire conveyor belt 100 described above and is typically an endless belt driven in a direction of travel (designated by arrow D), and constructed to address particular application requirements. Each row 702 includes a picket 800 that supports multiple modular top plates 900. Adjacent rows 702 are interconnected by a first set of cross-rods 704 that extends laterally (relative to the direction of travel D) through the pickets 800, generally forming a hinge connection. A second set of cross-rods 712 also extends laterally through the pickets 800. As shown, the first set of cross-rods 704 and the second set of cross-rods 712 are provided in an alternating pattern; however, fewer of the second set of cross-rods 712 can be provided depending on the application-specific requirements.

In use, the first set of cross-rods 704 is typically engaged by one or more sprockets driven by a motor that rotates the sprocket(s) to engage and drive against the first set of cross-rods 704 from beneath the flatwire conveyor belt 700. The second set of cross-rods 712 extends through and supports rollers 714. Each of the rollers 714 can rotate about a respective cross-rod of the second set of cross-rods 712 freely and independently from each other, the pickets 800, and the modular top plates 900. In other forms, some or all of the rollers 714 may be rotatably secured to the cross-rods 712 such that the rollers 714 and cross-rods 712 rotate in unison. It is contemplated that there may be greater or fewer rollers 714 per picket 800 (or per flatwire conveyor belt 700) than shown in FIG. 23, as adjustments can be made depending on the application-specific requirements (e.g., load-carrying capacity requirements). The example rollers 714 are generally cylindrical with a central axial opening though which the cross-rods 712 extend. In alternative embodiments, the rollers 714 may take other form factors, such as tapered, arcuate, convex, concave, and the like. The rollers 714 can be constructed of, for instance, a variety of plastic and/or metallic materials, and may include an internal bushing, bearing, and the like within the central axial opening to influence the relative engagement with the cross-rods 712 (e.g., reduce sliding friction).

In the example shown, both the first and second sets of cross-rods 704, 712 are metallic with ends 706, 716 that are formed or mushroomed to limit lateral movement (i.e., in a direction generally skewed to the direction of travel D) of the cross-rods 704, 712 once adjacent rows 702 are interconnected. In alternative embodiments, other restraint mechanisms can be used to restrain the cross-rods, such as collars or clips, and the cross-rods can be constructed of non-metallic materials (e.g., plastics or composites). One alternative example construction is shown in FIG. 23 in which the cross-rod 712 takes the form of an axle 802 that is captured in a row 804. Specifically, a modified picket 806 of the row 804 differs as the outermost side bar 808 does not include an opening aligned with the assembled axle 802. Thus, the axle 802 can be inserted through generally aligned openings 810 in the picket 806 until the axle 802 abuts the outermost side bar 808. The opening 810 formed in the opposite outermost side bar 812 can be blocked by a rivet 814 (or other structure, such as a plug, a clip, etc.) to inhibit the axle 802 from excessive lateral movement. In this embodiment, the axle 802 is generally free-floating, such that the axle 802 is able to rotate and shift laterally, while being ultimately restrained by the outermost side bar 808, the openings 810, and the rivet 814.

As shown in FIG. 24, the example second set of cross-rods 712 (or axle 802) can be spaced from the modular top plates 900 so that the second set of cross-rods 712 is lower in the pickets 800 in relation to the first set of cross-rods 706. As shown, a first dimension A between the center axis of the second set of cross-rods 712 and the top surface of the flatwire conveyor belt 700 is greater than a second dimension B between the center axis of the second set of cross-rods 712 and the bottom surface of the flatwire conveyor belt 700. This defines a gap 718 between the top of the rollers 714 and the modular top plates 900, thereby allowing the rollers 714 to extend below the pickets 800 but not interfere with the modular top plates 900. The relationship between the first dimension A and the second dimension B is generally constrained by the first dimension A avoiding interference between the rollers 714 and the modular top plates 900, and the second dimension B accommodating sufficient material of the picket 800 to achieve the particular application requirements (e.g., fatigue strength, load-carrying capacity, etc.). In one particular embodiment, the rollers 714 can be configured to extend beyond the bottom surface approximately 1/16" to 1/8", with a correspondingly sized gap 718.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, gauge, form-factor, and other features may vary based on application-specific requirements (e.g., product to be conveyed, environmental factors, speed of conveyance, operational envelope limitations, etc.). In addition, while the embodiments have been described in context of a metallic construction, it is contemplated that other materials (e.g., polymers) or composite constructions (e.g., a metallic base with a plastic overmold) are possible. The interface concept disclosed establishes a flatwire conveyor belt that maintains the strength of the assembly, as the conveyor belt is placed in tension during use, and further supports top plates in such a manner as to allow the top plates to be produced from relatively thin material, thereby reducing the net conveyor belt weight. Other types of conveyor belts may also benefit from the incorporation of aspects of the invention. The entire disclosure of each patent and publication cited herein is incorporated by reference, as if each such patent or publication were individually incorporated by reference herein.

Various features and advantages of the invention are set forth in the following claims.

The invention claimed is:

1. A flatwire conveyor belt assembly comprising:
   a plurality of pickets, each picket defining a leading link and a trailing link, wherein adjacent pickets are coupled with a cross-rod that extends through openings formed in the leading link and in the trailing link of adjacent pickets of the plurality of pickets; and
   a plurality of top plates coupled to the plurality of pickets, wherein the plurality of top plates define a conveying surface; and
   wherein each of the plurality of top plates defines a leading end and a trailing end, and an opening formed in the leading end of the top plate;
   wherein at least one of the leading end and the trailing end of the top plate is interfaced with one of the plurality of pickets; and
   wherein the cross-rod extends through the opening formed in the leading end of the top plate to interface the leading end of the top plate and the leading link of the picket.

2. The flatwire conveyor belt assembly of claim 1, further comprising:
   a slot formed in the trailing link of the picket;
   a tab formed in the trailing end of the top plate; and
   wherein the tab engages the slot to interface the trailing end of the top plate and the trailing link of the picket.

3. The flatwire conveyor belt assembly of claim 1, further comprising:
   another opening formed in the leading link of the picket;
   a tab formed in the leading end of the top plate; and
   wherein the tab engages the another opening to interface the leading end of the top plate and the leading link of the picket.

4. The flatwire conveyor belt assembly of claim 3, wherein:
   the tab further comprises an ear; and
   the ear is seated in the another opening formed in the leading link to inhibit separation of the top plate and the picket.

5. The flatwire conveyor belt assembly of claim 1, further comprising an array of perforations formed through the top plate.

6. A flatwire conveyor belt assembly comprising:
a plurality of pickets, each picket defining a leading link and a trailing link, wherein adjacent pickets are coupled with a cross-rod of a first set of cross-rods that extends through openings formed in the leading link and in the trailing link of adjacent pickets of the plurality of pickets;
a plurality of top plates coupled to the plurality of pickets, wherein the plurality of top plates define a conveying surface;
a second-set of cross-rods extending through the plurality of pickets; and
a roller received on each of the second-set of cross-rods; and
wherein the second set of cross-rods comprises axles that are spaced farther from the plurality of top plates than the first set of cross-rods.

7. A module capable of use in a flatwire conveyor belt assembly, the module comprising:
a picket having leading links and trailing links, the picket defining a picket leading portion proximate the leading links and a picket trailing portion proximate the trailing links;
a top plate having a leading end and a trailing end, the top plate defining a top plate leading portion proximate the leading end and a top plate trailing portion proximate the trailing end;
wherein the picket and the top plate interface at a leading interface defined by the interface of the picket leading portion and the top plate leading portion;
wherein the picket and the top plate interface at a trailing interface defined by the interface of the picket trailing portion and the top plate trailing portion;
wherein the picket leading portion comprises a picket opening;
wherein the top plate leading portion comprises a top plate opening; and
wherein the picket opening and the top plate opening are configured to interface when the top plate is positioned adjacent to the picket, such that a cross-rod can extend into the picket opening and the top plate opening to inhibit separation of the top plate and the picket.

8. The module of claim 7, wherein:
the picket leading portion comprises another opening;
the top plate leading portion comprises an ear; and
the another opening and the ear are configured to interface when the top plate is positioned atop the picket to inhibit separation of the top plate and the picket.

9. The module of claim 7 further comprising:
a second cross-rod extending through the picket; and
a roller received on the second cross-rod.

10. The module of claim 7, wherein:
the picket trailing portion comprises a slot;
the top plate trailing portion comprises a tab; and
the slot and the tab are configured to interface when the top plate is positioned atop the picket.

11. A top plate capable of use in a flatwire conveyor belt assembly having a picket that defines leading link ends and trailing link ends, the top plate comprising:
a leading end;
a top plate leading interface portion proximate the leading end;
a trailing end opposite the leading end;
a top plate trailing interface portion proximate the trailing end; and
a transport surface that extends between the leading end and the trailing end;
wherein the top plate leading interface portion is configured to selectively engage the leading link ends of the picket;
wherein the top plate trailing interface portion is configured to selectively engage the trailing link ends of the picket; and
wherein the top plate leading interface portion comprises at least one opening formed in a tab that is configured to receive a cross-rod for interconnecting adjacent pickets.

12. The top plate of claim 11, wherein the top plate leading interface portion comprises at least one ear that extends from the top plate.

13. The top plate of claim 12, wherein the at least one ear extends from the tab formed proximate the leading end of the top plate.

14. The top plate of claim 11, wherein the top plate trailing interface portion comprises at least one tab.

15. The top plate of claim 14, wherein the at least one tab extends parallel to the transport surface.

16. A flatwire conveyor belt system comprising:
a picket with a first set of openings;
a plurality of top plates configured to be removably attached to the picket, each top plate having an opening alignable with the first set of openings of the picket; and
a cross-rod received through the first set of openings of the picket and the openings of the top plates.

17. The flatwire conveyor belt system of claim 16, wherein:
each top plate has a trailing end with a tab;
the picket has a plurality of trailing end portions each with a slot; and
the tabs of the top plates are removably receivable within the slots of the trailing end portions.

18. The flatwire conveyor belt system of claim 16, wherein:
the picket has a second set of openings;
each top plate has an ear approximate the opening of the top plate; and
the ears of the top plates are removably receivable within the second set of openings of the picket.

19. A flatwire conveyor belt assembly comprising:
at least one picket having:
a leading link including:
a pair of leading leg portions;
a leading end portion connecting the pair of leading leg portions; and
a leading link interface; and
a trailing link including:
a pair of trailing leg portions;
a trailing end portion connecting the pair of trailing leg portions; and
a trailing link interface; and
at least one top plate having:
a leading top plate interface; and
a trailing top plate interface; and
wherein the leading link interface and the leading top plate interface are configured to establish a leading assembly coupling between the at least one top plate and the at least one picket;
wherein the trailing link interface and the trialing top plate interface are configured to establish a trailing assembly coupling between the at least one top plate and the at least one picket; and
wherein at least one of the leading assembly coupling and the trailing assembly coupling is configured to establish an elastically releasable coupling between the at least one top plate and the at least one picket.

20. The flatwire conveyor belt assembly of claim 19, wherein:
    the at least one picket further includes a sidebar extending between one leading leg portion of the pair of leading leg portions and one trailing leg portion of the pair of trailing leg portions to bridge the leading link and the trailing link;
    the leading link interface is integral with the leading end portion; and
    the trailing link interface is integral with the trailing end portion.

21. The flatwire conveyor belt assembly of claim 19, wherein the at least one top plate is configured to be elastically flexible to establish the elastically releasable coupling between the at least one top plate and the at least one picket.

22. The flatwire conveyor belt assembly of claim 19, wherein:
    the leading link interface is integral with the leading end portion and comprises a leading slot;
    the trailing link interface is integral with the trailing end portion and comprises a trailing slot;
    the leading top plate interface comprises a leading arm terminating in a leading tab configured to couple with the leading slot; and
    the trailing top plate interface comprises a trailing tail terminating in a trailing tab configured to couple with the trailing slot.

23. The flatwire conveyor belt assembly of claim 19, wherein:
    the leading link interface is integral with one of the pair of leading leg portions and comprises a leading opening;
    the trailing link interface is integral with the trailing end portion and comprises a trailing slot;
    the leading top plate interface comprises an ear integral with a tab configured to mate with the leading opening; and
    the trailing top plate interface comprises a trailing tail terminating in a trailing tab configured to mate with the trailing slot.

24. The flatwire conveyor belt assembly of claim 19, wherein:
    the leading link interface defines at least one of a leading link opening, a leading link slot, and a leading link tab;
    the trailing link interface defines at least one of a trailing link opening, a trailing link slot, and a trailing link tab;
    the leading top plate interface defines at least one of a leading top opening, a leading top slot, and a leading top tab; and
    the trailing top plate interface defines at least one of a trailing top opening, a trailing top slot, and a trailing top tab.

25. The flatwire conveyor belt assembly of claim 19, wherein:
    the at least one top plate includes a main body defining a transport surface;
    the leading top plate interface includes leading arms extending from the main body in a leading direction, the leading arms curve away from the transport surface and terminate in leading tabs extending toward the trailing tail;
    the trailing top plate interface includes a trailing tail extending form the main body in a trailing direction that is opposite the leading direction, the trailing tail curves away from the transport surface and terminates in a trailing tab extending toward the leading arms;
    the leading link interface includes a pair of slots configured to receive the leading tabs; and
    the trailing link interface includes a slot configured to receive the trailing tab.

* * * * *